(12) United States Patent
Schwindeman et al.

(10) Patent No.: US 6,344,521 B1
(45) Date of Patent: Feb. 5, 2002

(54) PROTECTED FUNCTIONALIZED DIENE AND ALKENYL SUBSTITUTED AROMATIC SILICONE TRIBLOCK COPOLYMERS AND PROCESSES FOR MAKING THE SAME

(75) Inventors: James Anthony Schwindeman, Lincolnton; Robert James Letchford, Cherryville, both of NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/480,511

(22) Filed: Jan. 10, 2000

Related U.S. Application Data

(63) Continuation-in-part of application No. 09/082,404, filed on May 20, 1998, now Pat. No. 6,020,430.

(51) Int. Cl.[7] .................................................. C08F 8/00
(52) U.S. Cl. ........................ 525/105; 525/100; 525/101; 525/103; 525/106; 525/474; 525/477; 525/479; 525/326.5; 525/342; 525/941
(58) Field of Search ................................ 525/100, 101, 525/103, 105, 106, 474, 477, 479, 326.5, 342, 941

(56) References Cited

U.S. PATENT DOCUMENTS

| | | | |
|---|---|---|---|
| 5,296,574 A | | 3/1994 | Hoxmeier |
| 5,521,255 A | * | 5/1996 | Roy ............................ 525/342 |
| 5,561,210 A | | 10/1996 | Roy |
| 5,576,388 A | | 11/1996 | St. Clair et al. |
| 5,618,903 A | | 4/1997 | Hoxmeier et al. |
| 5,728,469 A | * | 3/1998 | Mann et al. ................. 428/418 |
| 5,811,479 A | | 9/1998 | Labauze |

FOREIGN PATENT DOCUMENTS

| | | |
|---|---|---|
| GB | 1 289 526 | 9/1972 |

OTHER PUBLICATIONS

Marsiat et al., "Synthesis and Characterization of Polystyrene/Polydimethylsiloxane and Polyisoprene/Polydimethylsiloxane Block Copolymers," *Makromol. Chem.*, 176, 1641–1656 (1975).

Li et al., "Relationship Between Crystallization of the PDMS Block and Morphology of Poly(butadiene–b–Dimethylsiloxane)," *J. Poly. Sci.: Part B: Polymer Physics*, vol. 30, pp. 727–732 (1992).

Friedrich et al., "Synthesis and Test of Styrene—Cyclosiloxane and Butadiene—Cyclosiloxane Block Copolymers Containing Ultraviolet (UV) Absorber and Antioxidant Groups," *J. Inorganic and Organometallic Polymers*, vol. 1, No. 3, pp. 397–415 (1991).

Molenberg et al., "A Block Copolymer from Polystyrene and Columnar Liquid–Crystalline Polyl(diethylsiloxane)," *Macromolecules*, 29, pp. 3397–3400 (1996).

Lai et al., "Synthesis and Characterization of $\alpha,\omega$–Bis–(4–hydroxybutyl) Polydimethylsiloxanes," *Journal of Polymer Science: Part A: Polymer Chemistry*, vol. 33, 1773–1782 (1995).

Riffle, et al., "Elastomeric Polysiloxane Modifiers for Epoxy Networks," *Epoxy Resin Chemistry II*, American Chemical Society, 1983, pp. 21–54.

Wilczek et al., "Preparation and Characterization of Narrow Molecular Mass Distribution Polydimethylsiloxanes," *Polish Journal of Chemistry*, 55, 2419–2428 (1981).

McGrath, et al., "An Overview of the Polymerization of Cyclosiloxanes," *Initiation of Polymerization*, American Chemical Society, 1983, pp. 145–172.

Yilgör et al., "Polysiloxane Containing Copolymers: A Survey of Recent Developments," *Advances in Polymer Science*, 86, 1 (1988).

Yu et al., "Anionic polymerization and copolymerization of cyclosiloxanes initiated by trimethylsilylmethyllithium," *Polymer Bulletin*, 32, 35–40 (1994).

Frye et al., "Reactions of Organolithium Reagents with Siloxane Substrates," *Journal of Organic Chemistry*, vol. 35, No. 5, pp. 1308–1314, May, 1970.

* cited by examiner

*Primary Examiner*—Robert Dawson
*Assistant Examiner*—Jeffrey B Robertson
(74) *Attorney, Agent, or Firm*—Alston & Bird LLP

(57) ABSTRACT

Terminally functionalized silicone triblock copolymers prepared using protected functionalized initiators and processes for preparing the same. The silicone triblock copolymers includes protected, functionalized silicone diene and/or alkenylsubstituted aromatic copolymers. The protected functionalized copolymers can be optionally deprotected to afford functionalized silicone diene and/or alkenylsubstituted aromatic copolymers.

38 Claims, No Drawings

PROTECTED FUNCTIONALIZED DIENE AND ALKENYL SUBSTITUTED AROMATIC SILICONE TRIBLOCK COPOLYMERS AND PROCESSES FOR MAKING THE SAME

CROSS REFERENCE TO RELATED APPLICATIONS

This application is a continuation-in-part application of copending application Ser. No. 09/082,404, filed May 20, 1998, now U.S. Pat. No. 6,020,430 the entire disclosure of which is hereby incorporated by reference.

FIELD OF THE INVENTION

This invention relates to novel protected functionalized diene and alkenylsubstituted aromatic/silicone triblock copolymers, their optionally hydrogenated analogues, their optionally deprotected analogues, and processes for making the same.

BACKGROUND OF THE INVENTION

Silicone polymers have many unique properties, including wide service temperature range; low viscosity change vs. temperature; low flammability; shear stability; chemical inertness; oxidative stability; UV stability; low toxicity; and the like. These and other properties have facilitated the adoption of silicone polymers as dielectric, hydraulic, heat transfer, power transmission and damping fluids. Silicone polymers have also found applications as additives incorporated into plastics and rubbers as process and release aids, into coatings for flow and level control and into process streams as antifoams. Other unique properties have led to their introduction in acoustical applications such as ultrasonic sensor and sonar buoys. This proliferation of applications has engendered many improvements and refinements of silicone polymers.

Thermoplastic elastomers typically consist of a non-compliant, high modulus polymeric "hard segment" which is covalently bonded to a "soft" elastomeric segment comprised of polymer which is significantly above its glass transition temperature during use. These materials offer a useful combination of elastomeric properties without vulcanization.

Anionic polymerization of cyclosiloxanes, particularly hexamethylcyclotrisiloxane ($D_3$) and octamethyltetrasiloxane ($D_4$), has been reported previously. It is known that $D_3$ polymerization does not occur in hydrocarbon solvents. See C. L. Frye, R. M. Salinger, F. W. Fearon, J. M. Klosowski and T. deYoung, *J. Org. Chem.*, 35, 1308 (1970). Although the anionic species was formed (Bu—Si($CH_3$)$_2$)—O—Li$^+$), it did not polymerize. Addition of a polar promoter, such as THF, diglyme, or DME, then stimulated the polymerization. See J. M. Yu, D. Teyssie, R. B. Khalife and S. Boileau, Polymer Bulletin, 32, 35–40 (1994). The resultant polymer anion PDMS-O—Li$^+$ can then be protonated to afford PDMS-OH, capped with a silicon halide ($R^3R^4R^5$—Si—X) to afford PDMS-O—Si$R^3R^4R^5$, or coupled with suitable coupling agents (SiCl$_4$, Me$_2$SiCl$_2$, HSi(OMe)$_3$) to afford (PDMS)$_n$, where n=number of coupling agent functionalities. In spite of considerable synthetic efforts, however, there are few good ways to affix functionality to the termini of the silicone polymers.

Conventional hydrocarbon-based polymers generally lack mechanisms for bringing about crosslinking via low-temperature or ambient temperature cure (e.g., moisture cure or addition-cure). Such cure pathways are known in the case of siloxane polymers, and the development of such facile cure mechanisms for organic systems is highly desirable.

Unfunctionalized hydrocarbon/silicone diblock copolymers have been prepared by anionic techniques, as described in U.S. Pat. No. 5,618,903, *Makromol. Chem.*, 176, 1641 (1975), *Polym. Sci., Part B: Polym. Phys.*, 30, 727 (1992), *Inorg. and Organomet. Polym.*, 1, 397 (1991), and *Macromolecules*, 29, 3397 (1996). Symmetrical, homotelechelic, functionalized hydrocarbon/silicone block copolymers were also prepared anionically, as detailed in U.S. Pat. No. 5,561,210. Symmetrical homotelechelic functionalized hydrocarbon/silicon block copolymers were also prepared anionically, as detailed in U.S. Pat. No. 5,561,210.

SUMMARY OF THE INVENTION

The present invention provides novel protected functionalized heterotelechelic silicone block copolymers having the formula (I) or (II):

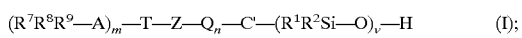

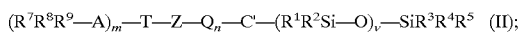

protected macromonomers of formula (II'):

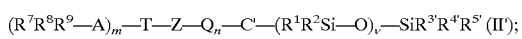

protected homotelechelic copolymers of formula (III):

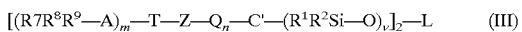

in which each T—(A—$R^7R^8R^9$)$_m$ as defined below is the same;

protected heterotelechelic copolymers of the formula (III'):

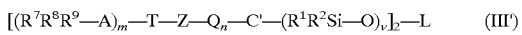

in which each T—(A—$R^7R^8R^9$)$_m$ as defined below is different and each C' can be the same or different;

protected heterotelechelic copolymers of the formula (III"):

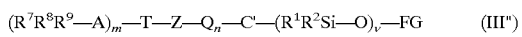

in which FG and T—(A—$R^7R^8R^9$)$_m$ are different; and protected radial copolymers of the formula (IV) or (V):

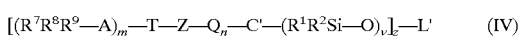

or

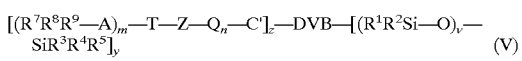

in which each T—(A—$R^7R^8R^9$)$_m$ and each C' can be the same or different, wherein:

Q is an unsaturated or hydrogenated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

C' is a hydrogenated or unsaturated block derived by anionic polymerization of one or more conjugated dienes, for example 1,3-butadiene or isoprene, or one or more alkenylsubstituted aromatic compounds, such as styrene or alpha-methylstyrene, or mixtures of one or more conjugated dienes and one or more alkenyl-substituted aromatic compounds;

DVB is radial polymer core prepared by addition of protected functionalized polymer anions to an alkenyl-substituted aromatic compound which contains two or more independently polymerizable vinyl groups, such as meta-divinylbenzene or para-divinylbenzene;

T is selected from the group consisting of oxygen, sulfur, and nitrogen groups and mixtures thereof;

$(A-R^7R^8R^9)_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl and substituted cycloalkyl or when T is nitrogen, $R^9$ is optionally a $-(CR'R')_l$-group linking two A wherein each R' is each independently selected from the group consisting of hydrogen, alkyl, substituted alkyl, aryl, substituted aryl, cycloalkyl, and substituted cycloalkyl, and 1 is an integer from 1 to 7; and m is 1 when T is oxygen or sulfur, and 2 when T is nitrogen;

$R^1$ and $R^2$ are each independently selected from the group consisting of hydrogen, alkyl, substituted alkyl, alkenyl, substituted alkenyl, aryl, and substituted aryl;

v is an integer from 2 to 100,000;

$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, and substituted aryl;

$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, substituted aryl, and free radically polymerizable groups, with the proviso that at least one of $R^3$, $R^4$, and $R^5$ is a free radically polymerizable group;

FG is a protected or non-protected functional group;

L is a residue of a difunctional linking agent, such as a $SiMe_2$ residue derived from the difunctional linking agent $SiMe_2Cl_2$;

L' is a residue of a multifunctional linking agent, such as a Si residue derived from the multifunctional linking agent $SiCl_4$; and y and z are each independently integers from 2 to 30.

The present invention also provides novel protected mono-functionalized triblock silicone copolymers, such as compounds having the formula (X), (XI), or (XII):

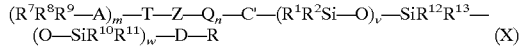
(X)

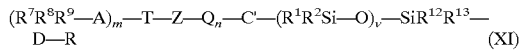
(XI)

and

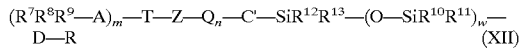
(XII)

wherein:

each Q is independently selected from an unsaturated or hydrogenated hydrocarbyl group derived by incorporation of one or more conjugated diene hydrocarbons, one or more alkenylsubstituted aromatic compounds, or a mixture of one or more dienes with one or more alkenylsubstituted aromatic compounds into a M—Z linkage;

each C' and D is independently selected from a hydrogenated or unsaturated block derived by anionic polymerization of one or more conjugated dienes, for example 1,3-butadiene or isoprene, or one or more alkenylsubstituted aromatic compounds, such as styrene or alpha-methylstyrene, or a mixture of one or more conjugated dienes and one or more alkenylsubstituted aromatic compounds;

$(A-R^7R^8R^9)_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl and substituted cycloalkyl or when T is nitrogen, $R^9$ is optionally a $-(CR'R')_1$-group linking two A wherein each R' is each independently selected from the group consisting of hydrogen, alkyl, substituted alkyl, aryl, substituted aryl, cycloalkyl, and substituted cycloalkyl, and 1 is an integer from 1 to 7; and m is 1 when T is oxygen or sulfur, and 2 when T is nitrogen;

each $R^1$, $R^2$, $R^{10}$, $R^{11}$, $R^{12}$, and $R^{13}$ is independently selected from the group consisting of hydrogen, alkyl, substituted alkyl, alkenyl, substituted alkenyl, aryl, and substituted aryl;

each R is independently selected from a hydrocarbyl group of 1–20 carbon atoms derived from an unfunctionalized initiator capable of initiating polymerization of conjugated dienes or alkenylsubstituted aromatic compounds; and each w and v is independently selected from an integer from 2 to 100,000.

The present invention also provides functionalized silicone copolymers and triblock silicone copolymers as described above in which at least one protecting group $-(A-R^7R^8R^9)_m$ has been removed to liberate the protected functionality T (oxygen, nitrogen, or sulfur). The functional groups can then optionally participate in various copolymerization reactions by reaction of the functional groups on the ends of the copolymer arms with selected difunctional or polyfunctional comonomers as described in more detail below to provide a silicone copolymer having polymer segments.

The novel copolymers can also be optionally hydrogenated to afford other novel copolymers. The protecting groups can be removed either prior to or following this hydrogenation.

The copolymers of the invention provide facile cure mechanisms for organic systems to allow crosslinking via low-temperature or ambient temperature cure (e.g., moisture cure or addition-cure). Thus, for example, a telechelic organic polymer of the invention having suitably reactive end-groups could be reacted through chain extension and/or crosslinking schemes to produce cured compositions having precise molecular weight between crosslinks, and therefore, more predictable and controllable properties. The copolymers of the invention are also useful as compatibilzers in polymer blends and as modifiers for pigments and fillers.

In addition, the copolymers of the invention provide advantages over the unfunctionalized hydrocarbon/silicone block copolymers described in U.S. Pat. No. 5,618,903, *Makromol. Chem.*, 176, 1641 (1975), *Polym. Sci., Part B: Polym. Phys.*, 30, 727 (1992), *Inorg. and Organomet.*

*Polym.*, 1, 397 (1991), and *Macromolecules*, 29, 3397 (1996), referenced above. For example, the copolymers of the invention provide the presence of terminal functionality on a hydrocarbon block. Further, the functionality on the hydrocarbon block can be readily altered by change in initiator species. Still further, a variety of heteroatoms can be incorporated into hydrocarbon block by change in the initiator, and the protecting group can be easily removed.

The copolymers of the invention are also advantageous over the symmetrical, homotelechelic functionalized block copolymers of U.S. Pat. No. 5,561,210. The present invention is superior to this reference because the functionality of each polymer chain is precisely controlled. In addition, each of the hydrocarbon polymer segments can be derived from the same or different monomers and each of the hydrocarbon polymer segments can be the same or different molecular weight. Further each of the hydrocarbon polymer segments can be the same or different microstructure.

The polymers and processes of the invention can provide other advantages. Typically silicone polymers are produced using traditional equilibrium reaction approaches. Such processes, however, provide limited or no control of polymer molecular weight distribution and byproducts. In contrast, the copolymers of the present invention can be prepared using anionic polymerization techniques. This allows production of copolymers having a relatively narrow molecular weight distribution ($M_w/M_n$), typically less than or about 1.5, and fewer byproducts.

In addition, the molecular architecture of copolymers of the present invention can be precisely controlled. For example, the monomer composition, length and molecular weight of the arms of multi-branched polymers can be independently manipulated by varying the monomer charged to the initiator. The microstructure of the hydrocarbon segments can also be varied. Also various protected functional groups and different protected heteroatoms can be introduced into the same multi-arm copolymer molecule by employing a mixture of initiators that contain different heteroatoms. Further, differentially protected heteroatoms can be introduced into the same multi-arm copolymer molecule by employing a mixture of initiators that contain different protecting groups.

Still further, different protecting groups can be removed sequentially to afford a polymer with some of the functional groups exposed, and some protected. The newly exposed functional groups can then participate in various copolymerization reactions, or reaction with methacroyl chloride to afford a macromonomer. The remaining protecting groups can then be removed, and then these functional groups can then participate in further copolymerization reactions.

DETAILED DESCRIPTION OF THE INVENTION

The silicone copolymers of the present invention include copolymers of the following formulas:
protected copolymers of formulas (I) and (II):

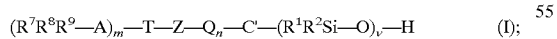  (I);

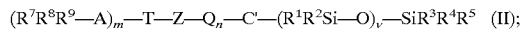  (II);

protected macromonomers of formula (II'):

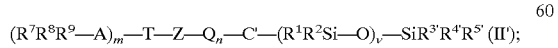  (II');

protected homotelechelic copolymers of formula (III):

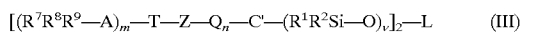  (III)

in which each T—(A—$R^7R^8R^9$)$_m$ as defined below is the same;

protected heterotelechelic copolymers of the formula (III'):

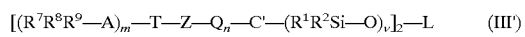  (III')

in which each T—(A—$R^7R^8R^9$)$_m$ as defined below is different and further in which each C' can be the same or different;

protected heterotelechelic copolymers of the formula (III"):

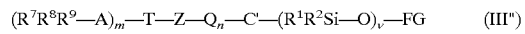  (III")

in which FG and T—(A—$R^7R^8R^9$)$_m$ as defined below are different; and protected radial copolymers of the formula (IV) or (V):

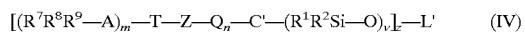  (IV)

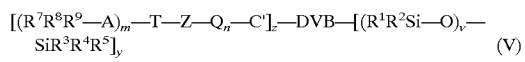  (V)

in which each T—(A—$R^7R^8R^9$)$_m$ and each C' can be the same or different;

wherein:

Q is an unsaturated or hydrogenated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

C' is a hydrogenated or unsaturated block derived by anionic polymerization of one or more conjugated dienes, for example 1,3-butadiene or isoprene, or one or more alkenylsubstituted aromatic compounds, such as styrene or alpha-methylstyrene, or mixtures of one or more conjugated dienes and one or more alkenyl-substituted aromatic compounds;

DVB is radial polymer core prepared by addition of protected functionalized polymer anions to an alkenyl-substituted aromatic compound which contains two or more independently polymerizable groups;

T is selected from the group consisting of oxygen, sulfur, and nitrogen groups and mixtures thereof;

(A—$R^7R^8R^9$)$_m$ is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl and substituted cycloalkyl or when T is nitrogen, $R^9$ is optionally a —(CR'R')$_l$-group linking two A wherein each R' is each independently selected from the group consisting of hydrogen, alkyl, substituted alkyl, aryl, substituted aryl, cycloalkyl, and substituted cycloalkyl, and l is an integer from 1 to 7; and m is 1 when T is oxygen or sulfur, and 2 when T is nitrogen. Thus the skilled artisan will appreciate that $R^9$ as used herein includes the group

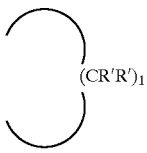

linking two A groups;
v is an integer from 2 to 100,000;
$R^3$, $R^4$, and $R^5$ are each independently selected from the group consisting of hydrogen, alkyl, substituted alkyl, fluorinated alkyl, alkyl containing an acetal functionality, alkenyl, substituted alkenyl, aryl, and substituted aryl;
$R^{3'}$, $R^{4'}$, and $R^{5'}$ are each independently selected from the group consisting of hydrogen, alkyl, substituted alkyl, fluorinated alkyl, alkyl containing an acetal functionality, alkenyl, substituted alkenyl, aryl, substituted aryl, and free radically polymerizable groups, with the proviso that at least one of $R^{3'}$, $R^{4'}$, and $R^{5'}$ is a free radically polymerizable group;
FG is a protected or non-protected functional group;
L is a residue of a difunctional linking agent, such as a $SiMe_2$ residue derived from the difunctional linking agent $SiMe_2Cl_2$;
L' is a residue of a multifunctional linking agent, such as a Si residue derived from the multifunctional linking agent $SiCl_4$; and
y and z are each independently integers from 2 to 30.

The present invention also provides novel protected mono-functionalized triblock silicone block copolymers, including compounds having the formula (X), (XI), or (XII) as follows:

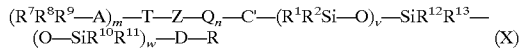

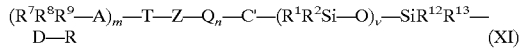

and

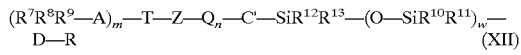

wherein:
each Q is independently selected from an unsaturated or hydrogenated hydrocarbyl group derived by incorporation of one or more conjugated diene hydrocarbons, one or more alkenylsubstituted aromatic compounds, or a mixture of one or more dienes with one or more alkenylsubstituted aromatic compounds into a M—Z linkage;
each Z is independently selected from a branched or straight chain hydrocarbon connecting group which contains 3–25 carbon atoms, optionally substituted with aryl or substituted aryl;
each C' and D is independently selected from a hydrogenated or unsaturated block derived by anionic polymerization of one or more conjugated dienes, for example 1,3-butadiene or isoprene, or one or more alkenylsubstituted aromatic compounds, such as styrene or alpha-methylstyrene, or a mixture of one or more conjugated dienes and one or more alkenylsubstituted aromatic compounds;
each T is independently selected from the group consisting of oxygen, sulfur, and nitrogen groups and mixtures thereof;
each $(A-R^7R^8R^9)_m$ is independently selected from a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl and substituted cycloalkyl or when T is nitrogen, $R^9$ is optionally a $-(CR'R')_1$-group linking two A wherein each R' is each independently selected from the group consisting of hydrogen, alkyl, substituted alkyl, aryl, substituted aryl, cycloalkyl, and substituted cycloalkyl, and 1 is an integer from 1 to 7; and m is 1 when T is oxygen or sulfur, and 2 when T is nitrogen. Thus the skilled artisan will appreciate that $R^9$ as used herein includes the group

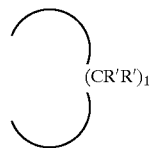

linking two A groups;
each $R^1$, $R^2$, $R^{10}$, $R^{11}$, $R^{12}$, and $R^{13}$ is independently selected from the group consisting of hydrogen, alkyl, substituted alkyl, alkenyl, substituted alkenyl, aryl, and substituted aryl;
each R is independently selected from a hydrocarbyl group of 1–20 carbon atoms derived from an unfunctionalized initiator capable of initiating polymerization of conjugated dienes or alkenyl substituted aromatic compounds; and
each w and v is independently selected from an integer from 2 to 100,000.

The present invention provides numerous advantages over prior silicon polymers and processes for making the same. For example, the anionic polymerization processes of the invention can provide improved control of copolymer molecular distribution (typically less than or about 1.5) and fewer byproducts. In addition, copolymers of the invention which include two or more polymer arms or branches can include arms of varying composition, length and molecular weight.

As used herein, unless otherwise indicated, the term "alkyl" refers to straight chain and branched C1–C25 alkyl. The term "substituted alkyl" refers to C1–C25 alkyl substituted with one or more lower C1–C10 alkyl, lower alkoxy, lower alkylthio, or lower dialkylamino. The term "cycloalkyl" refers to C3–C12 cycloalkyl. The term "substituted cycloalkyl" refers to C3–C12 cycloalkyl substituted with one or more lower C1–C10 alkyl, lower alkoxy, lower alkylthio, or lower dialkylamino. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl, lower alkoxy, lower alkylthio, or lower dialkylamino. Exemplary aryl and substituted aryl groups include, for example, phenyl, benzyl, and the like. The term "alkenyl" refers to C2–C20 alkenyl and the term "substituted alkenyl" refers to C2–C20 alkenyl substituted with one or more lower C1–C10 alkyl, lower alkoxy, lower alkylthio, or lower dialkylamino. The term "free radically polymerizable group" refers to ethylenically unsaturated groupings, such as an omega-acrylate or methacrylate substituted alkyl groups (such as 3-(methacryloxy)propyl), alkenyl substituted aromatic compounds (such as 4-vinylphenyl), and the like.

The novel protected functionalized silicone copolymers of the present invention can be prepared as described in detail below.

Protected functionalized living polymer anions can be prepared by anionically polymerizing a conjugated diene, a mixture of conjugated diene monomers, an alkenylsubstituted aromatic compound, a mixture of alkenylsubstituted aromatic compounds, or a mixture of one or more conjugated diene monomers together with one or more alkenyl-substituted aromatic compounds in an inert solvent, optionally in the presence of a polar modifier, at a temperature from −30° C. to 150° C. for a period of at least one hour with one or more protected functionalized initiators having the formula:

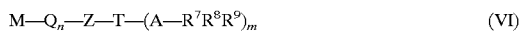

or

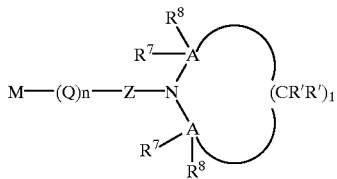

wherein:

M is an alkali metal selected from the group consisting of lithium, sodium and potassium;

Q is an unsaturated or hydrogenated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;

n is an integer from 0 to 5;

Z is a branched or straight chain hydrocarbon connecting group which contains 3–25 carbon atoms, optionally substituted with aryl or substituted aryl;

T is selected from the group consisting of oxygen, sulfur, and nitrogen groups and mixtures thereof;

(A—$R^7R^8R^9$)m is a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl, and substituted cycloalkyl or as illustrated when T is nitrogen, $R^9$ is optionally a —(CR'R')$_2$-group linking two A wherein each R' is each independently selected from the group consisting of hydrogen, alkyl, substituted alkyl, aryl, substituted aryl, cycloalkyl, and substituted cycloalkyl; and m is 1 when T is oxygen or sulfur, and 2 when T is nitrogen; and l is an integer from 1 to 7, to produce living protected functionalized polymer anions.

Silicone block copolymer anions can then be prepared by anionically polymerizing one or more cyclic siloxane monomers of the formula ($R^1R^2SiO$)$_y$, wherein $R^1$ and $R^2$ are each independently selected from the group consisting of hydrogen, alkyl, substituted alkyl, alkenyl, substituted alkenyl, aryl, and substituted aryl and y=3–10, in an inert solvent, optionally containing a polymerization promoter, at a temperature from −30° C. to 250° C. for a period of at least one hour with a protected functionalized living polymer anion as described above to provide a living silicone diene and/or alkenylsubstituted aromatic copolymer anion.

Protonation of the silicone copolymer anion with a suitable protonating agent, for example acetic acid, affords a protected block copolymer (I):

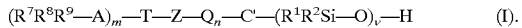

Capping of the silicone copolymer anion with one or more silicon halides or alkoxides of the formula ($R^3R^4R^5$—Si—X), wherein $R^3$, $R^4$ and $R^5$ are as defined above and X is halogen or alkoxide which contain 1–20 carbon atoms, affords a protected copolymer (II):

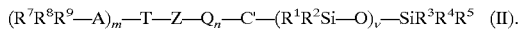

Capping of the silicone copolymer anion with one or more silicon halides or alkoxides of the formula ($R^{3'}R^{4'}R^{5'}$—Si—X), wherein $R^{3'}$, $R^{4'}$ and $R^{5'}$ are as defined and X is halogen or alkoxide which contain 1–20 carbon atoms, affords a protected functionalized macromonomer (II'):

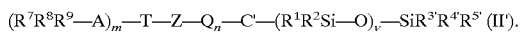

Coupling the living copolymer anion with one or more difunctional coupling agents, for example Me$_2$SiCl$_2$, affords a protected homotelechelic block copolymer (III):

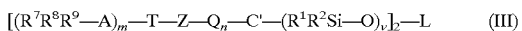

in which each —T—(A—$R^7R^8R^9$)$_m$ is the same (and in which example L is SiMe$_2$), or, alternatively, a protected heterotelechelic copolymer of formula (III'):

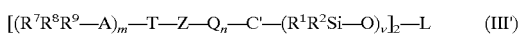

in which each T—(A—$R^7R^8R^9$)$_m$ differs and each C' can be the same or different. As used herein, the term "heterotelechelic" copolymers include polymers in which: each functional group T differs and is similarly protected (i.e., each —(A—$R^7R^8R^9$)$_m$ is the same); each functional group T is the same and is dissimilarly protected (i.e., each —(A—$R^7R^8R^9$)$_m$ differs); and each functional group T differs and is dissimilarly protected. In this aspect of the invention, the heterotelechelic polymers can be produced by separately polymerizing siloxane monomers with different protected functionalized living polymers as described above to produce different protected functionalized silicone copolymer anions and thereafter linking the different polymer anions using excess linking agent. As will be appreciated by the skilled artisan, the polymer branches can vary in monomer composition, molecular weight, length, and the like.

The living copolymer anion can be functionalized using a functionalizing agent or electrophile or other material as known in the art to be useful for terminating or end capping living polymers to provide protected heterotelechelic copolymers of formula (III"):

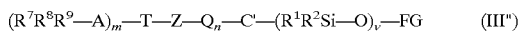

in which FG and T—(A—$R^7R^8R^9$)$_m$ differ.

Coupling the living silicon copolymer with one or more multifunctional coupling agents, for example SiCl$_4$, affords a protected radial copolymer (IV):

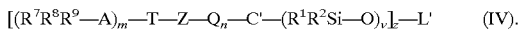

(in which example L' is Si and z is 4), in which each T—(A—R$^7$R$^8$R$^9$)$_m$ and each C' can be the same or different. In this regard, when a mixture of protected functionalized initiators of formula VI or VII above is used, the resultant radial polymer can include arms in which each functional group T differs and is similarly protected; each functional group T is the same and is dissimilarly protected; or each functional group T differs and is dissimilarly protected. In addition, a mixture of functional and non-functional initiators (such as alkyllithium initiators) can also be used to produce radial silicone polymers having both functionalized and non-functional arms. The radial polymers can be also prepared by separately polymerizing siloxane monomers (using the same or different conjugated diene, alkenylsubstituted aromatic and/or silicon monomers and/or initiators) to provide living anions, and thereafter linking the living polymer anions with a suitable linking agent. The resultant radial polymer can include arms or branches of varying monomer composition, protected functionality, protecting groups, lengths and molecular weights.

Radial polymers of the formula:

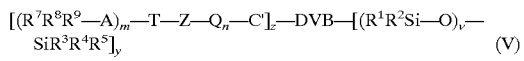

[(R$^7$R$^8$R$^9$—A)$_m$—T—Z—Q$_n$—C']$_z$—DVB—[(R$^1$R$^2$Si—O)$_v$—SiR$^3$R$^4$R$^5$]$_y$  (V)

in which each T—(A—R$^7$R$^8$R$^9$)$_m$ and each C' can be the same or different can be prepared by polymerizing one or more diene and/or alkenylsubstituted aromatic monomers with a protected functionalized initiator as described above to form living protected functionalized polymer anions; adding at least one alkenylsubstituted aromatic compound which contains two or more independently polymerizable vinyl groups (such as isomeric divinylbenzenes or diisopropenylbenzenes) to the protected functionalized living polymer anions to form a multi-arm living polymer having a central core; adding one or more siloxane monomers as described above to grow or polymerize siloxane arms from the central core to form a multi-arm living silicone copolymer; and reacting the multi-arm living silicone copolymer with a capping agent to provide a protected functionalized silicone radial copolymer of formula (V).

Novel protected, functionalized silicone triblock copolymers of the present invention of the formula X may be prepared as described in detail below.

Protected, functionalized living polymer anions (R$^7$R$^8$R$^9$—A)$_m$—T—Z—Q$_n$—C'—M (XIII) can be prepared by anionically polymerizing a conjugated diene, a mixture of conjugated diene monomers, an alkenylsubstituted aromatic compound, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about –30° C. to about 150° C., for a period of at least about one hour, with a protected functionalized initiator as described above having the formula:

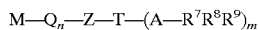

M—Q$_n$—Z—T—(A—R$^7$R$^8$R$^9$)$_m$  (VI)

or

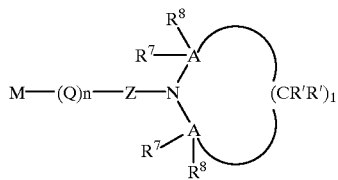

wherein each of M, Q, n, Z, T, A, R$^7$, R$^8$, R$^9$, R$^1$ and l are as defined above with regard to the compounds of formula (VI) and (VII).

Silicone block copolymer anions (R$^7$R$^8$R$^9$—A)$_m$—T—Z—Q$_n$—C'—(R$^1$ R$^2$Si—O)$_v$—M (XIV) may then be prepared by anionically polymerizing one or more cyclic siloxane monomers (R$^1$R$^2$SiO)$_y$ as defined above in an inert solvent, optionally containing a polymerization promoter, at a temperature from about –30° C. to about 250° C., for a period of at least about one hour, with a protected functionalized living polymer anion (R$^7$R$^8$R$^9$—A)$_m$—T—Z—Q$_n$—C'—M (XIII).

The resultant silicone copolymer anion (XIV) can be capped with an excess of a dialkyl or diaryl silicon dihalide of the formula R$^{12}$R$^{13}$SiX$_2$, wherein R$^{12}$ and R$^{13}$ are as defined above and X is halide, for example dichlorodimethylsilane, to afford a capped protected block copolymer (XV):

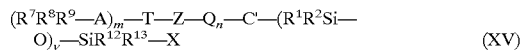

(R$^7$R$^8$R$^9$—A)$_m$—T—Z—Q$_n$—C'—(R$^1$R$^2$Si—O)$_v$—SiR$^{12}$R$^{13}$—X  (XV)

Excess dialkyl or diaryl silicon dihalide can be removed.

Living polymer anions R—D—M can be prepared by anionically polymerizing one or more conjugated diene monomers, a mixture of conjugated diene monomers, one or more alkenylsubstituted aromatic compound, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about –30° C. to about 150° C., for a period of at least about one hour, with an initiator having the formula:

R—M wherein R is a hydrocarbyl group of 1–20 carbon atoms and M is defined as an alkali metal.

Silicone block copolymer anions R—D—(SiR$^{10}$R$^{11}$—O)$_w$—M (XVI) may then be prepared by anionically polymerizing one or more cyclic siloxane monomers (R$^{10}$R$^{11}$SiO)$_y$, wherein R$^{10}$, R$^{11}$ and y are as defined above, in an inert solvent, optionally containing a polymerization promoter, at a temperature from about –30° C. to about 250° C., for a period of at least about one hour, with a living polymer anion R—D—M.

Coupling the copolymer (XV) with the copolymer anion (XVI) affords the protected, functionalized triblock copolymer (X):

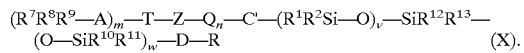

(R$^7$R$^8$R$^9$—A)$_m$—T—Z—Q$_n$—C'—(R$^1$R$^2$Si—O)$_v$—SiR$^{12}$R$^{13}$—(O—SiR$^{10}$R$^{11}$)$_w$—D—R  (X).

Alternatively, protected, functionalized triblock copolymers of the formula X may be prepared as described in detail below.

Protected, functionalized living polymer anions of the (R$^7$R$^8$R$^9$—A)$_m$—T—Z—Q$_n$—C'—M (XIII) can be prepared and reacted with one or more cyclic siloxane monomers to form silicone block copolymer anions $(R^7R^8R^9—A)_m—T—Z—Q_n—C'—(R^1R^2Si—O)_v—M$ (XIV), as described above.

Living polymer anions R—D—M may also be prepared and reacted with one or more siloxane monomers to form silicone block copolymer anions $R—D—(SiR^{10}R^{11}—O)_w—M$ (XVI), also as described above. The anions(s) of formula (XVI) may then be capped with an excess of an dialkyl or diaryl silicon dihalide $(R^{12}R^{13}SiX_2)$ to afford protected block copolymer (XVII):

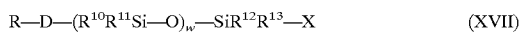

Excess dialkyl or diaryl silicon dihalide may be removed.
Coupling the copolymer $R—D—(R^{10}R^{11}Si—O)_w—SiR^{12}R^{13}—X$ (XVII) with the copolymer anion $(R^7R^8R^9—A)_m—T—Z—Q_n—C'—(R^1R^2Si—O)_v—M$ can afford the protected, functionalized triblock copolymer (X):

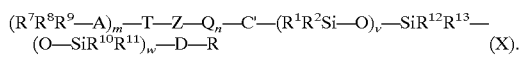

Novel protected, functionalized silicone triblock copolymers of the present invention of formula XI may be prepared as described in detail below.

Protected, functionalized living polymer anions $(R^7R^8R^9—A)_m—T—Z—Q_n—C'—M$ (XIII) may be prepared and reacted with one or more siloxane monomers $(R^1R^2SiO)_y$ to make silicone block copolymer anions $(R^7R^8R^9A)_m—T—Z—Q_n—C'—(R^1R^2Si—O)_v—M$ (XIV), all as described above. Capping of the silicone copolymer anion (XIV) with an excess of a dialkyl or diaryl silicon dihalide $(R^{12}R^{13}SiX_2)$ can afford protected block copolymer (XV):

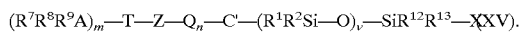

Excess dialkyl or diaryl silicon dihalide $(R^{12}R^{13}SiX_2)$ may be removed.

Living polymer anions R—D—M may be prepared as described above and coupled with the protected, functionalized silicone copolymer $(R^7R^8R^9—A)_m—T—Z—Q_n—C'—(R^1R^2Si—O)_v SiR^{12}R^{13}—X$ (XV) to afford the protected, functionalized silicone triblock copolymer (XI):

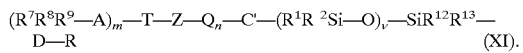

Alternatively, protected, functionalized triblock copolymers of structure XI may be prepared as described in detail below.

Protected, functionalized living polymer anions $(R^7R^8R^9—A)_m—T—Z—Q_n—C'—M$ (XIII) may be prepared and reacted with one or more siloxane monomers $(R^1R^2SiO)_y$ to make silicone block copolymer anions $(R^7R^8R^9—A)_m—T—Z—Q_n—C'—(R^1R^2Si—O)_v—M$ (XIV), as described above. Living polymer anions R—D—M can be prepared as described above and capped with an excess of an dialkyl or diaryl silicon dihalide $(R^{12}R^{13}SiX_2)$ to afford a polymer $R—D—SiR^{12}R^{13}—X$ (XVIII). Excess dialkyl or diaryl silicon dihalide may be removed. Coupling the protected, functionalized silicone block copolymer anions $(R^7R^8R^9—A)_m—T—Z—Q_n—C'—(R^1R^2Si—O)_v—M$ (XIV) with the polymer $R—D—SiR^{12}R^{13}—X$ (XVIII) affords the copolymer (XI):

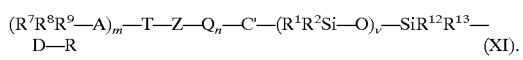

Novel protected, functionalized silicone triblock copolymers of the present invention such as those having the formula XII may be prepared as described in detail below.

Protected, functionalized living polymer anions $(R^7R^8R^9—A)_m—T—Z—Q_n—C'—M$ (XIII) and living polymer anions R—D—M may be prepared as described above. Silicone block copolymer anions $R—D—(SiR^{10}R^{11}—O)_w—M$ (XVI) may then be prepared by anionically polymerizing one or more cyclic siloxane monomers $(R^{10}R^{11}SiO)_y$, with a living polymer anion R—D—M, also as described above. Capping of the silicone copolymer anion $R—D—(SiR^{10}R^{11}—O)_w—M$ (XVI) with an excess of a dialkyl or diaryl silicon dihalide $(R^{12}R^{13}SiX_2)$ can afford protected block copolymer (XVII):

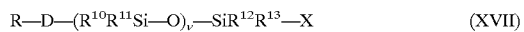

Excess dialkyl or diaryl silicon dihalide $(R^{12}R^{13}SiX_2)$ may be removed. Coupling the copolymer $R—D—(R^{10}R^{11}Si—O)_v—SiR^{12}R^{13}—X$ (XVII) with the polymer anion $(R^7R^8R^9—A)_m—T—Z—Q_n—C'—M$ (XIII) will afford the protected, functionalized triblock copolymer (XII):

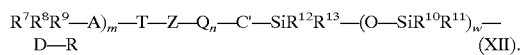

Alternatively, the protected, functionalized triblock copolymers of structure XII may be prepared as described in detail below.

Protected, functionalized living polymer anions $(R^7R^8R^9—A)_m—T—Z—Q_n—C'—M$ (XIII) may be prepared and cappped with an excess of a dialkyl or diaryl silicon dihalide $R^{12}R^{13}SiX_2$ to afford protected block polymer (XIX):

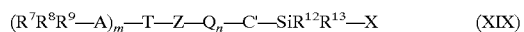

Excess dialkyl or diaryl silicon dihalide may be removed.

Living polymer anions R—D—M may be prepared and reacted with one or more cyclic siloxane monomers $(R^{10}R^{11}SiO)_y$ to make silicone block copolymer anions $R—D—(SiR^{10}R^{11}—O)_w—M$ (XVI) as described above. Coupling the polymer $(R^7R^8R^9—A)_m—T—Z—Q_n—C'—SiR^{12}R^{13}—X$ (XIX) with the copolymer anion $R—D—(SiR^{10}R^{11}—O)_w—M$ (XVI) can afford the protected, functionalized triblock copolymer (XII):

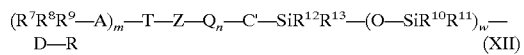

These procedures efficiently afford terminally protected, functionalized silicone block copolymers. The nature of the protected functional groups or the heteroatom can be varied by merely changing the identity of the functional initiator. The number of terminal functional groups can be varied by merely selecting the appropriate terminating agent or coupling agent.

U.S. Pat. Nos. 5,496,940 and 5,527,753 disclose novel, tertiary amino initiators which are soluble in hydrocarbon solvents. These initiators, useful in practicing this invention, are derived from omega-tertiary-amino-1-haloalkanes of the following general structures:

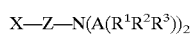

and

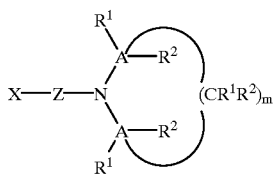

wherein: X is halogen, preferably chlorine or bromine; Z is a branched or straight chain hydrocarbon connecting group which contains 3–25 carbon atoms, optionally substituted with aryl or substituted aryl; A is an element selected from Group IVa of the Periodic Table of the Elements; $R^1$, $R^2$, and $R^3$ are each independently selected from the group consisting of hydrogen, alkyl, substituted alkyl, aryl, substituted aryl, cycloalkyl, and substituted cycloalkyl; and m is an integer from 1 to 7. The process reacts selected omega-tertiary-amino-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl 1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2 -dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(2,2,5,5-tetramethyl-2,5-disila-1-azacyclopentane)-1-propyl halide, 4-(2,2,5,5-tetramethyl-2,5-disila-1-azacyclopentane)-1-butyl halide, 6-(2,2,5,5-tetramethyl-2,5-disila-1-azacyclopentane)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group preferably is chlorine or bromine.

U.S. Pat. No. 5,600,021 discloses novel monofunctional ether initiators which are soluble in hydrocarbon solvents. These initiators, useful in practicing this invention, are derived from omega-protected-hydroxy-1-haloalkanes of the following general structure:

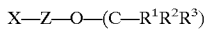

wherein: X is halogen, preferably chlorine or bromine; Z is a branched or straight chain hydrocarbon connecting group which contains 3–25 carbon atoms, optionally substituted with aryl or substituted aryl; and $R^1$, $R^2$, and $R^3$ are each independently selected from the group consisting of hydrogen, alkyl, substituted alkyl, aryl, substituted aryl, cycloalkyl, and substituted cycloalkyl. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate is employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes useful in practicing this invention include, but are not limited to, 3-(1,1-dimethylethoxy)-1-propyl halide, 3-(1,1-dimethylethoxy)-2-methyl -1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-diemthyl-1-propyl halide, 4-(1,1 -dimetlylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino]-1-ethoxy]-1-propyl halide, 3-[2-(1-piperidino)-1-ethoxy]-1-propyl halide, 3-[2-(1-pyrrolidino)-1-ethoxy] -1-propyl halide 4-[3-

(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is preferably chlorine or bromine.

U.S. Pat. No. 5,362,699 discloses novel monofunctional silyl ether initiators which are soluble in hydrocarbon solvents. These initiators, useful in practicing this invention, are derived from omega-silyl-protected-hydroxy-1-haloalkanes of the following general structure:

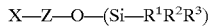

$X—Z—O—(Si—R^1R^2R^3)$ wherein: X is halogen, preferably chlorine or bromine; Z is a branched or straight chain hydrocarbon group which contains 3–25 carbon atoms, optionally substituted with aryl or substituted aryl; and $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25 ° C. and about 40 ° C., in an alkane, cycloalkane or aromatic reaction solvent containing 5 to 10 carbon atoms and mixtures of such solvents.

t-Butyldimethylsilyl protected compounds, for example 4-(t-butyldimethylsilyloxy)-1-butylhalide, are prepared from t-butyldimethylchlorosilane, and the corresponding halo-alcohol, according to the method described in U.S. Pat. No. 5,493,044. Omega-silyloxy-1-haloalkanes prepared in accord with this earlier process useful in practicing this invention include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 6-(t-butyldimethylsilyloxy)-1-hexyl halide, and 3-(trimethylsilyloxy)-2,2-dimethyl-1-propyl halide. The halo- or halide group is preferably chlorine or bromine.

Monofunctional thioether initiators useful in the practice of this invention are derived from omega-protected-thio-1-haloalkanes of the following general structure:

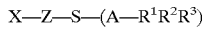

$X—Z—S—(A—R^1R^2R^3)$ wherein: X is halogen, preferably chlorine or bromine; Z is a branched or straight chain hydrocarbon group which contains 3–25 carbon atoms, optionally substituted with aryl or substituted aryl; $(A—R^1R^2R^3)$ is a protecting group in which A is an element selected from Group IVa of the Periodic Table of the Elements; $R^1$, $R^2$, and $R^3$ are each independently selected from the group consisting of hydrogen, alkyl, substituted alkyl, aryl, substituted aryl, cycloalkyl, and substituted cycloalkyl. The process reacts selected omega-thioprotected-1-haloalkyls whose alkyl groups contain 3 to 25 carbon atoms, with lithium metal at a temperature between about 35 ° C. and about 130° C., preferably at the reflux temperature of an alkane, cycloalkane or aromatic reaction solvent containing 5 to 10 carbon atoms and mixtures of such solvents.

The initiator precursor, omega-thio-protected-1-haloalkanes (halides), are prepared from the corresponding halothiol by the standard literature methods. For example, 3-(1,1-dimethylethylthio)-1-propylchloride is synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involved the reaction of the appropriate thiol with 2-methyl-2-butene catalyzed by boron trifluoride etherate is employed for the preparation of the t-amyl thioethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, are prepared by the reaction of the omega-chloro-thiol with bromochloromethane, methanol, and potassium hydroxide, by the method of F. D. Toste and I. W. J. Still, Synlett, 1995, 159. t-Butyldimethylsilyl protected compounds, for example 4-(t-butyldimethylsilylthio)-1-butylhalide, are prepared from t-butyldimethylchlorosilane, and the corresponding thiol, according to the method described in U.S. Pat. No. 5,493,044.

Omega-thio-protected 1-haloalkanes prepared in accord with this earlier process useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3 -(methoxymethylthio)-1-propylhalide, 3-(methoxymethylthio)-2-methyl-1-propylhalide, 3-(methoxymethylthio,-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1- dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is preferably chlorine or bromine.

The initiators of the formulae

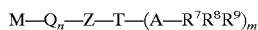

$$M-Q_n-Z-T-(A-R^7R^8R^9)_m \quad (VI)$$

or

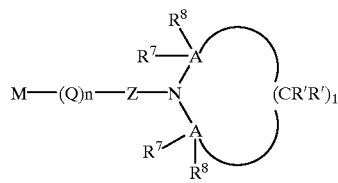

are prepared by reacting a compound of the formula $$M-Z-T-(A-R^7R^8R^9)_m \quad (VIII)$$

or

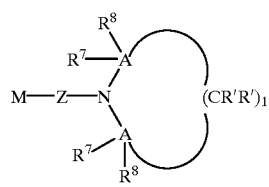

(IX)

wherein M, Z, T, A, $R^7$, $R^8$, $R^9$, R', m and 1 have the meanings ascribed above, with one or more conjugated diene hydrocarbons, one or more alkenylsubstituted aromatic compounds, or mixtures of one or more dienes with one or more alkenylsubstituted aromatic compounds, to form an extended hydrocarbon chain between M and Z in formulas (VIII) and (IX), which extended chain is denoted as $Q_n$ in formulas (VI) and (VII). The compounds of formula (VIII) and (IX) are prepared by first, reacting in an inert solvent a selected tertiary amino-1-haloalkane or an omega-hydroxy-protected-1-haloalkane or an omega-thio-protected-1-haloalkane, depending on whether "T" is to be N, O or S (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula VIII or IX), which is then optionally reacted with one or more conjugated diene hydrocarbons, one or more alkenylsubstituted aromatic compounds, or mixtures of one or more dienes with one or more alkenylsubstituted aromatic compounds, in a predominantly alkane, cycloalkane, or aromatic reaction solvent, or mixture thereof, which solvent contains 5 to 10 carbon atoms, and mixtures of such solvents to produce a monofunctional initiator with an extended chain or tether between the metal atom (M) and element (T) in formula (VI) and (VII) above and mixtures thereof with compounds of Formula (VIII) and/or (IX).

Thus, incorporation of Q groups into the M—Z linkage to form the compounds of formulas (VI) and (VII) above involves addition of compounds of the formula

$$M-Z-T-(A-R^7R^8R^9)_m \quad (VIII)$$

or (IX)

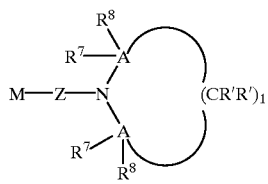

where the symbols have the meanings ascribed above, across the carbon to carbon double bonds in compounds selected from the group consisting of one or more conjugated diene hydrocarbons, one or more alkenylsubstituted aromatic compounds, or mixtures of one or more dienes with one or more alkenylsubstituted aromatic compounds to produce new carbon-lithium bonds of an allylic or benzylic nature, similar to those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M—Z (M=Li) bonds, themselves.

Suitable conjugated dienes to produce the chain extended initiator preferably contain from 4 to 12, more preferably from 4 to 8, carbon atoms per molecule. Examples of these compounds include without limitation 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and the like and mixtures thereof. Among the dialkylbutadienes, it is preferred that the alkyl groups contain from 1 to 3 carbon atoms.

Suitable alkenylsubstituted aromatic compounds to produce the chain extended initiator include without limitation styrene, alpha-methylstyrene, vinyltoluene, 2-vinylpyridine, 4-vinylpyridine, 1-vinylraphthalene, 2-vinylnaphthalene, 1-alpha-methylvinylnaphthalene, 2-alpha-methylvinylnaphathalene, 1,2-diphenyl-4-methylhexene-1 and the like and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include without limitation 3-methylstyrene, 3,5-diethylstyrene, 4-(tert-butyl)-styrene, 2-ethyl-4-benzylstyrene, 4-phenylstyrene, 4-p-tolylstyrene, 2,4-divinyltoluene, 4,5-dimethyl-1-vinylnaphthalene, and the like and mixtures thereof. Reference is made to U.S. Pat. No. 3,377,404 for disclosures of additional vinyl-substituted aromatic compounds. Non-polymerizable alkenyl substituted aromatic compounds such as 1,1-diphenylethylene may also be used.

The hydrocarbon monomer to be polymerized is selected from the group of conjugated alkadienes, such as butadiene and isoprene, and alkenylsubstituted aromatic compounds, such as styrene and alpha-methylstyrene. The hydrocarbon monomers may be polymerized alone, or in admixture with each other to form random copolymers, or by charging the monomers to the reaction mixture sequentially to form block copolymers. Examples of conjugated diene hydrocarbons include, but are not limited to, 1,3-butadiene, isoprene, 2,3-dimethyl-1,3-butadiene, 1,3-pentadiene, myrcene, 2-methyl-3-ethyl-1,3-butadiele, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, and the like and mixtures thereof. Examples of polymerizable alkenylsubstituted aromatic compounds which can be anionically polymerized include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene, and the like, and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Again, reference is made to U.S. Pat. No. 3,377,404 for disclosures of additional alkenylsubstituted aromatic compounds.

The inert solvent employed during the polymerizations is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Polar solvents (modifiers) can be added to the hydrocarbon polymerization reaction to alter the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran, 2-methyltetrahydrofuran, methyl tert-butyl ether, 1,2-dimethoxyethane (glyme), 1,2-diethoxyethane, diazabicyclo [2.2.2]octane, triethylamine, tributylamine, N-methylpiperidine, N-methylpyrrolidine, N,N,N',N'-tetramethylethylene diamine (TMEDA), and the like, and mixtures thereof. The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

Examples of silicone monomers $(R^1R^2SiO)_y$ and $(R^{10}R^{11}SiO)_y$ include, but are not limited to, $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_3$, $(PhHSiO)_4$, $(PhHSiO)_5$, $(vinylHSiO)_3$, $(vinylHSiO)_4$, $(vinylHSiO)_5$, $(vinylMeSiO)_3$, $(vinylMeSiO)_4$, $(vinylMeSiO)_5$, $(PhMeSiO)_3$, $(PhMeSiO)_4$, $(PhMeSiO)_5$, and the like and mixtures thereof.

Examples of capping or terminating agents of the formula $(R^3R^4R^5—Si—X)$ useful for the preparation of functionalized macromonomers, include, but are not limited to, chloro-(3-methacryloxypropyl)dimethylsilane, (3-methacryloxypropyl)trimethoxysilane, chloro-(2-methacryloxyethyl)-dimethylsilane, chloro-(2-acryloxyethyl)dimethylsilane, chloro-dimethyl-4-vinylphenylsilane, chlorodimethyl-2-vinylphenylsilane, epihalohydrins, such as epichlorohydrin, and the like and mixtures thereof.

Examples of capping or terminating agents of the formula $(R^3R^4R^5—Si—X)$ include, but are not limited to, $Me_3Si$—Cl, t-$ButylMe_2Si$—Cl, $Et_3Si$—Cl, $Me_2PhSi$—Cl, $Me_2vinylSi$—Cl, $Et_3Si$—OMe, $Et_3Si$—OEt, 1H,1H,2H,2H-perfluorodecyldimethyl-chlorosilane (see U.S. Pat. No. 5,486,568), $CH_3CH_2OCHCH_3OCH_2CH_2CH_2SiMe_2OPh$ (see U.S. Pat. No. 5,478,899), $Me_3Si$—Br, $Me_2vinylSi$—OMe, $Me_2PhSi$—OMe, and the like and mixtures thereof.

Examples of difunctional coupling agents useful in forming protected homotelechelic and heterotelechelic silicone polymers include, but are not limited to, $Me_2SiCl_2$, $Me_2Si(OMe)_2$, $Me_2SnCl_2$, $Ph_2SiCl_2$, $MePhSiCl_2$, $ClMe_2SiCH_2CH_2SiMe_2Cl$, $Me_2SiBr_2$, and the like and mixtures thereof.

Examples of multifunctional coupling agents include, but are not limited to, $SiCl_4$, $SnCl_4$, $MeSiCl_3$, $HSi(OMe)_3$, $Si(OEt)_4$, $Cl_3SiSiCl_3$, and the like and mixtures thereof.

Examples of silicone polymerization promoters include, but are not limited to, tetrahydrofuran (THF), N,N,N',N-tetramethylethylene diamine (TMEDA), 1,2-dipipieridinoethane (DPE), dimethylsulfoxide (DMSO), N,N,N',N-tetraethylethylene diamine (TEEDA), 1,2-dimethoxyethane (DME), and the like and mixtures thereof.

Non-functionalized initiators capable of initiating polymerization of conjugated dienes or alkenylsubstituted aromatic compounds useful in the practice of this invention are represented by the formula R—M, wherein M is an alkali metal selected from lithium, sodium and potassium; and R represents an aliphatic, cycloaliphatic, or arylsubstituted aliphatic radical. Preferably, R is an alkyl or substituted alkyl group of 1–20 carbon atoms. Such initiators include, but are not limited to, methyllithium, ethyllithium, n-propyllithium, 2-propyllithium, n-butyllithium, s-butyllithium, t-butyllithium, isobutyllithium, n-hexyllithium, n-octyllithium, 2-ethylhexyllithium, 2-(cyclohexyl) ethyllithium, and the like, and mixtures thereof.

Electrophiles that are useful in functionalizing the polymeric living anion include, but are not limited to, haloalkyltrialkoxysilanes, alkenylhalosilanes and omega-alkenylarylhalosilanes, such as chlorotrimethylsilane and styrenyldimethyl chlorosilane; allyl halides, such as allyl bromide and allyl chloride; epihalohydrins, such as epichlorohydrin, epibromohydrin, and epiiodohydrin, and other materials as known in the art to be useful for terminating or end capping silicon polymers. The only proviso is that the initiator and the electrophile contain different functional groups, thus leading to hetero-telechelic polymers. The functionalizing step can be conducted at temperatures ranging from about −30° C. to about 150° C.

Examples of methods to hydrogenate the polymers of this invention are described in U.S. Pat. Nos. 4,970,254, 5,166,277, 5,393,843 and 5,496,898. The hydrogenation of the functionalized polymer is conducted in situ, or in a suitable solvent, such as hexane, cyclohexane, or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

If desired, the protecting groups can be removed from the silicone copolymer. This deprotection can be performed either prior to or after the optional hydrogenation of the residual aliphatic unsaturation. For example, to remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed by reaction of the polymer with trifluoroacetic acid, p-toluenesulfonic acid or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41.

The tert-butyldimethylsilyl protecting groups can be removed by treatment of the polymer cement with acid, such as hydrochloric acid, acetic acid, paratoluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83. If desired, the protecting groups can be selectively removed from the polymer in the presence of each other either prior to or after the optional hydrogenation of the residual aliphatic unsaturation.

The following table details experimental conditions that will selectively remove one of the protecting groups (more labile) from the polymer, while retaining the other protecting group (more stable).

| LABILE | STABLE | CONDITIONS |
| --- | --- | --- |
| t-Butyldimethylsilyl | Acetal | Tetrabutylammonium fluoride |
| t-Butyldimethylsilyl | Ketal | Tetrabutylammonium fluoride |
| t-Butyldimethylsilyl | Orthoester | Tetrabutylammonium fluoride |
| t-Butyldimethylsilyl | Aminal | Tetrabutylammonium fluoride |
| Acetal | t-Butyl | 1 N HCl |
| Ketal | t-Butyl | 1 N HCl |
| Orthoester | t-Butyl | 1 N HCl |
| Aminal | t-Butyl | 1 N HCl |
| Acetal | Dialkylamino | 1 N HCl |
| Ketal | Dialkylamino | 1 N HCl |
| Orthoester | Dialkylamino | 1 N HCl |
| Aminal | Dialkylamino | 1 N HCl |
| 2,2,5,5-Tetramethyl-2,5-disila-1-azacyclopentane | Acetal | Tetrabutylammonium Fluoride |
| 2,2,5,5-Tetramethyl-2,5-disila-1-azacyclopentane | Ketal | Tetrabutylammonium Fluoride |
| 2,2,5,5-Tetramethyl-2,5-disila-1-azacyclopentane | Orthoester | Tetrabutylammonium Fluoride |
| 2,2,5,5-Tetramethyl-2,5-disila-1-azacyclopentane | Aminal | Tetrabutylammonium Fluoride |

Deprotection of copolymer (I) affords a functionalized silicone copolymer with the structure:

wherein T, Z, Q, C', $R^1$, $R^2$, m, n, and v are as defined above. Deprotection of copolymer (II) affords a functionalized silicone copolymer with the structure:

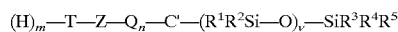

wherein T, Z, Q, C', $R^1$, $R^2$, $R^3$, $R^4$, $R^5$, m, n, and v are as defined above. Deprotection of copolymer (II') affords a functionalized silicone macromonomer with the structure:

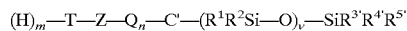

wherein T, Z, Q, C', $R^1$, $R^2$, $R^{3'}$, $R^{4'}$, $R^{5'}$, m, n, and v are as defined above. Deprotection of copolymer (III) affords a functionalized homotelechelic silicone copolymer with the structure:

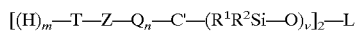

wherein T, Z, Q, C', $R^1$, $R^2$, L, m, n, and v are as defined above.

Deprotection of copolymer (III') affords a functionalized heterotelechelic silicone copolymer with the structure:

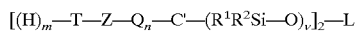

in which T, Z, Q, C', $R^2$, $R^3$, L, m, n, and v are as defined above, with the proviso that each T is different.

Deprotection of copolymer (III") affords a functionalized heterotelechelic silicone copolymer with the structure:

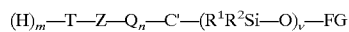

in which T, Z, Q, C', $R^1$, $R^2$, FG, m, n, and v are as defined above, with the proviso that each T is different.

As the skilled artisan will appreciate, a heterotelechelic copolymer (III') or (III") having different protecting groups can be selectively deprotected to remove one but not the other of the protecting groups. This allows the ability to perform additional chemistries at the liberated functional groups (such as copolymerization to form polymer segments or modification of the functional groups to a different functionality, as described in more detail below), followed optionally by deprotection and additional chemistries of the remaining protected functional group.

Deprotection of copolymer (IV) and (V) affords functionalized radial copolymers with the following structures:

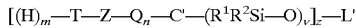

or

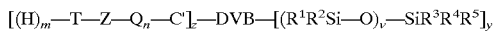

in which T, Z, Q, C', DVB, $R^1$, $R^2$, $R^3$, $R^4$, $R^5$, L', m, n, v, y and z are as defined above. Similar to the heterotelechelic copolymers, for radial copolymers (IV) and (V) having differently protected functional groups T, the functional groups can be selectively deprotected to remove one but not the other of the protecting groups, additional chemistries performed at the liberated functional groups, followed optionally by deprotection and additional chemistries of the remaining protected functional groups.

Deprotection of copolymers (X), (XI), and (XII) affords functionalized silicone copolymers with the following structures, respectively:

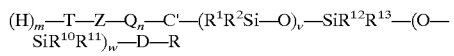

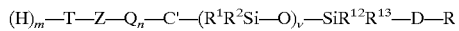

and

wherein T, Z, Q, C', D, R, $R^1$, $R^2$, $R^{10}$, $R^{11}$, $R^{12}$, $R^{13}$, m, n, v and w are as defined above.

As discussed above, the polymers of the invention can be deprotected, and the polymers can optionally be reacted with one or more comonomers to polymerize a functional end thereof. Protecting groups can be removed simultaneously or sequentially. For example, the polymers can be reacted with one or more comonomers in the presence of a strong acid catalyst to simultaneously deprotect the functional polymer and polymerize the functional end thereof to produce novel segmented block polymers. Alternatively, differently protected functional groups can be selectively deprotected to remove one but not the other of the protecting groups, additional chemistries performed at the liberated functional groups, followed optionally by deprotection and additional chemistries of the remaining protected functional groups.

Exemplary comonomers include without limitation cyclic ethers, diamines, diisocyanates, polyisocyanates, di-, poly- and cyclic amides, di- and polycarboxylic acids, diols, polyols, anhydrides, and th, like and mixtures thereof. For example, functionalized copolymers can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides or lactones and diols to form polyester blocks, or diols and polyols with diisocyanates or polyisocyanates to form polyurethane blocks. Polyisocyanates or polyfunctional polyols are examples of polyfunctional monomers. The functional group may also be reacted with a suitable agent containing a reactive olefinic bond, such as a styrenic or acrylic functionality, such as methacroyl chloride, which will act to change the nature of the functionality and provide a "macromonomer" capable of polymerizing with other free radically polymerizable monomers.

The present invention will be further illustrated by the following non-limiting examples.

EXAMPLE 1

Preparation of Alpha-(t-Butoxy)-Omega-Trimethsilyloxy-Block-Polyisoprene-Block-Poly(dimethylsiloxane)

A 250 ml glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium (chain extended with two equivalents of isoprene) 16.0 wt. % in cyclohexane, 0.516 grams (2.0 mmoles) is added to the reactor with a syringe via the inlet tube. Cyclohexane, 100 ml, is then vacuum distilled directly into the reactor. The flask is then removed from the vacuum line by a flame seal. Isoprene, 20.00 grams (294 mmole) is then added from a break-seal ampoule. The reaction mixture is stirred at room temperature for twelve hours to complete the polymerization. An aliquot is withdrawn with a syringe through the sample port, quenched with degassed methanol, and examined by SEC, and has the following properties:

$M_n = 1.00 \times 10^4$ g/mole $M_w = 1.04 \times 10^4$ g/mole $M_w/M_n = 1.04$.

Sublimed hexamethylcyclotrisiloxane, 12.0 grams (53.9 mmole), is dissolved in cyclohexane (20 ml) and this solution is added from one of the break seal ampoules. Dry tetrahydrofuran, 20 ml, is then added from another ampoule. The reaction mixture is then placed in a constant temperature bath at 40° C. After eight hours, the conversion is about 90%. Excess chlorotrimethylsilane, 1.09 grams (10.0 mmole) is then added to terminate the polymerization, added from the last break-seal ampoule. The functionalized polymer is recovered by precipitation two times into methanol, and vacuum dried for twenty four hours.

The resultant functionalized silicone polymer is characterized by $^1$H NMR and SEC, and has the following properties:

$M_n = 1.60 \times 10^4$ g/mole $M_w = 1.70 \times 10^4$ g/mole $M_w/M_n = 1.06$.

The $^1$H NMR spectrum exhibits a peak at 1.17 ppm for the t-butoxy group. No cyclic oligomer is detected by SEC analysis.

EXAMPLE 2

Preparation of Alpha-(2,2,5,5-Tetramethyl-2,5-Disila-1-Azacyclopentyl)-Omega-(3-Methacryloxypropyl)-dimethylsilyl-Block-Polyisoprene-Block-Poly(methylphenylsiloxane)

A 250 ml glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(2,2,5,5-Tetramethyl-2,5-disila-1-azacyclopentane)-1-propyllithium 12.0 wt. % in cyclohexane, 0.725 grams (3.5 mmoles) is added to the reactor with a syringe via the inlet tube. Cyclohexane, 100 ml, is then vacuum distilled directly into the reactor. The flask is then removed from the vacuum line by a flame seal. Isoprene, 21.00 grams (308.3 mmole) is then added from a break-seal ampoule. The reaction mixture is stirred at room temperature for twelve hours to complete the polymerization. An aliquot is withdrawn with a syringe through the sample port, quenched with degassed methanol, and examined by SEC, and has the following properties:

$M_n$=6.00×10³ g/mole
$M_w$=6.24×10³ g/mole
$M_w/M_n$=1.04.

Methylphenylcyclotrisiloxane, 21.0 grams (51.4 mmole), is dissolved in cyclohexane (20 ml) and this solution is added from one of the ampoules. Dry tetrahydrofuran, 20 ml, is then added from another ampoule. The reaction mixture is then placed in a constant temperature bath at 40° C. After eight hours, the conversion is about 90%. The polymerization reaction is terminated with 3.09 grams (14 mmole) of chloro-(3-methacryloxypropyl)-dimethylsilane, added from the last break-seal ampoule. The functionalized polymer is recovered by precipitation two times into methanol, and is vacuum dried for twenty four hours.

The resultant functionalized silicone polymer is characterized by ¹H NMR and SEC, and has the following properties:

$M_n$=1.20×10⁴ g/mole
$M_w$=1.30×10⁴ g/mole
$M_w/M_n$=1.08.

No cyclic oligomer is detected by SEC analysis.

The NMR clearly exhibits the signals characteristic of the methacryl group.

EXAMPLE 3

Preparation of Alpha-Amino-Omega-(3-Methacryloxypropyl)-dimethylsilyl-Block-Polyisoprene-Block-Poly(methylphenylsiloxane)

A 100 ml, flask is fitted with a magnetic stir bar, a reflux condenser, and a nitrogen inlet. This apparatus is dried in an oven overnight at 125° C., assembled hot, and allowed to cool in a stream of nitrogen. The protected amine functionalized silicone polymer, prepared in Example 2, (1.00 gram), tetrahydrofuran (10 ml) and 1N HCl (1 ml) are added to the flask. The reaction mixture is heated to reflux. The progress of the reaction is monitored by TLC, for disappearance of the starting material. Once all the starting material had been consumed, the reaction mixture is allowed to cool to room temperature. After solvent removal, the resultant polymer cement is precipitated into methanol and is vacuum dried.

The resultant functionalized silicone polymer is characterized by ¹H NMR and SEC, and has the following properties:

$M_n$=1.20×10⁴ g/mole
$M_w$=1.30×10⁴ g/mole
$M_w/M_n$=1.08.

The NMR clearly exhibits the signals characteristic of the methacryl group.

EXAMPLE 4

Preparation of ABA Triblock Telechelic-(t-Butyldimethylsilyloxy)-Block-Polybutadiene-Block-Poly(dimethylsiloxane)

A 250 ml glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(t-Butyldimethylsilyloxy)-1-propyllithium 18.0 wt. % in cyclohexane, 0.901 grams (5.0 mmoles) is added to the reactor with a syringe via the inlet tube. Cyclohexane, 100 ml, is then vacuum distilled directly into the reactor. The flask is then removed from the vacuum line by a flame seal. Butadiene, 25.00 grams (430.7 mmole) is then added from a break-seal ampoule. The reaction mixture is stirred at room temperature for sixteen hours to complete the polymerization. An aliquot is withdrawn with a syringe through the sample port, quenched with degassed methanol, and examined by SEC, and has the following properties:

$M_n$=5.00×10³ g/mole
$M_w$=5.15×10³ g/mole
$M_w/M_n$=1.03.

Sublimed hexamethylcyclotrisiloxane, 50.0 grams (224.7 mmole), is dissolved in cyclohexane (20 ml) and this solution is added from one of the break seal ampoules. Dry tetrahydrofuran, 20 ml, and anhydrous N,N-dimethylacetamide, 1.0 ml, is then added from another ampoule. The reaction mixture is then placed in a constant temperature bath at 40° C. After eight hours, the conversion is about 90%. Excess dichlorodimethylsilane, 1.94 grams (15.0 mmole) is then added to terminate the polymerization, added from the last break-seal ampoule. The functionalized polymer is recovered by precipitation two times into methanol, and vacuum dried for twenty four hours.

The resultant functionalized silicone polymer is characterized by ¹H NMR and SEC, and has the following properties:

$M_n$=2.00×10⁴ g/mole
$M_w$=2.12×10⁴ g/mole
$M_wM_n$=1.06.

The ¹H NMR spectrum exhibits a peak at 0.88 ppm for the t-butyldimethylsilyloxy group, No cyclic oligomer is detected by SEC analysis.

EXAMPLE 5

Preparation of Alpha-(t-Butoxy)-Omega-Trimethsilyloxy-Block-Polyisoprene-Block-Poly(dimethylsiloxane)

A 250 mt. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium (chain extended with two equivalents of isoprene) 16.0 wt. % in cyclohexane, 0.516 grams (2.0 mmoles) is added to the reactor with a syringe via the inlet tube. Cyclohexane, 100 ml., is then vacuum distilled directly into the reactor. The flask is then removed from the vacuum line by a flame seal. Isoprene, 20.00 grams (294 mmole) is then added from a break-seal ampoule. The reaction mixture is stirred at room temperature for twelve hours to complete the polymerization. An aliquot is withdrawn with a syringe through the sample port, quenched with degassed methanol, and examined by SEC, and has the following properties:

$M_n$=1.00×10⁴ g/mole
$M_w$32 1.04×10⁴ g/mole
$M_w/M_n$=1.04

Sublimed hexamethylcyclotrisiloxane, 12.0 grams (53.9 mmole), is dissolved in cyclohexane (20 ml.) and this solution is added from one of the break seal ampoules. Dry tetrahydrofuiran, 20 ml., is then added from another ampoule. The reaction mixture is then placed in a constant temperature bath at 40° C. After eight hours, the conversion is about 90%. Excess chlorotrimethylsilane, 1.09 grams (10.0 mmole) is then added to terminate the polymerization, added from the last break-seal ampoule. The functionalized polymer is recovered by precipitation two times into methanol, and vacuum dried for twenty four hours.

The resultant functionalized silicone polymer is characterized by $^1$H NMR and SEC, and has the following properties:

$M_n$=1.60×10$^4$ g/mole
$M_w$=1.70×10$^4$ g/mole
$M_w/M_n$=1.06

The $^1$HNMR spectrum exhibits a peak at 1.17 ppm for the t-butoxy group. No cyclic oligomer is detected by SEC analysis.

EXAMPLE 6

Preparation of Alpha-(2,2,5,5-Tetramethyl-2,5-Disila-1-Azacyclopentyl)-Omega-(3-Methacryloxypropyl)-dimethylsilyl-Block-Polyisoprene-Block-Poly(methylphenylsiloxane)

A 250 ml. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(2,2,5,5-Tetramethyl-2,5-disila-1-azacyclopentane)-1-propyllithium 12.0 wt. % in cyclohexane, 0.725 grams (3.5 mmoles) is added to the reactor with a syringe via the inlet tube. Cyclohexane, 100 ml., is then vacuum distilled directly into the reactor. The flask is then removed from the vacuum line by a flame seal. Isoprene, 21.00 grams (308.3 mmole) is then added from a break-seal ampoule. The reaction mixture is stirred at room temperature for twelve hours to complete the polymerization. An aliquot is withdrawn with a syringe through the sample port, quenched with degassed methanol, and examined by SEC, and has the following properties:

$M_n$=6.00×10$^3$ g/mole
$M_w$=6.24×10$^3$ g/mole
$M_w/M_n$=1.04

Methylphenylcyclotrisiloxane, 21.0 grams (51.4 mmole), is dissolved in cyclohexane (20 ml.) and this solution is added from one of the ampoules. Dry tetrahydrofuran, 20 ml., is then added from another ampoule. The reaction mixture is then placed in a constant temperature bath at 40° C. After eight hours, the conversion is about 90%. The polymerization reaction is terminated with 3.09 grams (14 mmole) of chloro-(3-methacryloxypropyl)-dimethylsilane, added from the last break-seal ampoule. The functionalized polymer is recovered by precipitation two times into methanol, and is vacuum dried for twenty four hours.

The resultant functionalized silicone polymer is characterized by $^1$HNMR and SEC, and has the following properties:

$M_n$=1.20×10$^4$ g/mole
$M_w$=1.30×10$^4$ g/mole
$M_w/M_n$=1.08

No cyclic oligomer is detected by SEC analysis.
The NMR clearly exhibits the signals characteristic of the methacryl group.

EXAMPLE 7

Preparation of Alpha-Amino-Omega-(3-Methacryloxypropyl)-dimethylsilyl-Block-Polyisoprene-Block-Poly(methylphenylsiloxane)

A 100 ml., flask is fitted with a magnetic stir bar, a reflux condenser, and a nitrogen inlet. This apparatus is dried in an oven overnight at 125° C., assembled hot, and allowed to cool in a stream of nitrogen. The protected amine functionalized silicone polymer, prepared in Example 2, (1.00 gram), tetrahydrofuran (10 ml) and 1 N HCl (1 ml.) are added to the flask. The reaction mixture is heated to reflux. The progress of the reaction is monitored by TLC, for disappearance of the starting material. Once all the starting material had been consumed, the reaction mixture is allowed to cool to room temperature. After solvent removal, the resultant polymer cement is precipitated into methanol and is vacuum dried.

The resultant functionalized silicone polymer is characterized by $^1$HNMR and SEC, and has the following properties:

$M_n$=1.20×10$^4$ g/mole
$M_w$=1.30×10$^4$ g/mole
$M_w/M_n$=1.08

The NMR clearly exhibits the signals characteristic of the methacryl group.

EXAMPLE 8

Preparation of ABA Triblock Telechelic-(t-Butyldimethylsilyloxy)-Block-Polybutadiene-Block-Poly(dimethylsiloxane)

A 250 ml. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(t-Butyldimethylsilyloxy)-1-propyllithium 18.0 wt. % in cyclohexane, 0.901 grams (5.0 mmoles) is added to the reactor with a syringe via the inlet tube. Cyclohexane, 100 ml., is then vacuum distilled directly into the reactor. The flask is then removed from the vacuum line by a flame seal. Butadiene, 25.00 grams (430.7 mmole) is then added from a break-seal ampoule. The reaction mixture is stirred at room temperature for sixteen hours to complete the polymerization. An aliquot is withdrawn with a syringe through the sample port, quenched with degassed methanol, and examined by SEC, and has the following properties:

$M_n$=5.00×10$^3$ g/mole
$M_w$=5.15×10$^3$ g/mole
$M_w/M_n$=1.03

Sublimed hexamethylcyclotrisiloxane, 50.0 grams (224.7 mmole), is dissolved in cyclohexane (20 ml.) and this solution is added from one of the break seal ampoules. Dry tetrahydrofuran, 20 ml., and anhydrous N,N-dimethylacetamide, 1.0 ml, is then added from another ampoule. The reaction mixture is then placed in a constant temperature bath at 40° C. After eight hours, the conversion is about 90%. Excess dichlorodimethylsilane, 1.94 grams (15.0 mmole) is then added to terminate the polymerization, added from the last break-seal ampoule. The functionalized polymer is recovered by precipitation two times into methanol, and vacuum dried for twenty four hours.

The resultant functionalized silicone polymer is characterized by $^1$HNMR and SEC, and has the following properties:

$M_n = 2.00 \times 10^4$ g/mole $M_w = 2.12 \times 10^4$ g/mole $M_w/M_n = 1.06$ The $^1$HNMR spectrum exhibits a peak at 0.88 ppm for the t-butyldimethylsilyloxy group.

No cyclic oligomer is detected by SEC analysis.

The foregoing examples are illustrative of the present invention and are not to be construed as limiting thereof. The invention is defined by the following claims, with equivalents of the claims to be included therein.

That which is claimed is:

1. Protected functionalized triblock silicone block copolymers selected from the group consisting of:

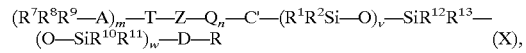   (X),

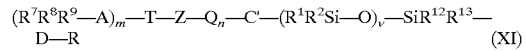   (XI)

and

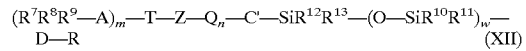   (XII)

wherein:

each Q is independently selected from an unsaturated or hydrogenated hydrocarbyl group derived by incorporation of one or more conjugated diene hydrocarbons, one or more alkenylsubstituted aromatic compounds, or a mixture of one or more dienes with one or more alkenylsubstituted aromatic compounds;

each n is independently an integer from 0 to 5;

each Z is independently selected from a branched or straight chain hydrocarbon connecting group which contains 3–25 carbon atoms, optionally substituted with aryl or substituted aryl;

each C' and D is independently selected from a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

each T is independently selected from the group consisting of oxygen, sulfur, and nitrogen groups and mixtures thereof;

each $(A-R^7R^8R^9)_m$ is independently a protecting group in which A is an element selected from Group IVa of the Periodic Table of the Elements; $R^7$, $R^8$, and $R^9$ are each independently selected from the group consisting of hydrogen, alkyl, substituted alkyl, aryl, substituted aryl, cycloalkyl and substituted cycloalkyl or when T is nitrogen, each $R^9$ is optionally a $-(CR'R')_l$-group linking two A wherein each R' is each independently selected from the group consisting of hydrogen, alkyl, substituted alkyl, aryl, substituted aryl, cycloalkyl, and substituted cycloalkyl, and l is an integer from 1 to 7; and m is 1 when T is oxygen or sulfur, and 2 when T is nitrogen;

each $R^1$, $R^2$, $R^{10}$, $R^{11}$, $R^{12}$, and $R^{13}$ is independently selected from the group consisting of hydrogen, alkyl, substituted alkyl, alkenyl, substituted alkenyl, aryl, and substituted aryl;

each R is independently selected from a hydrocarbyl group of 1–20 carbon atoms derived from an unfunctionalized initiator capable of initiating polymerization of conjugated dienes or alkenyl substituted aromatic compounds; and each w and v is independently selected from an integer from 2 to 100,000.

2. The protected functionalized silicone copolymer of claim 1, wherein said copolymer comprises a compound of the formula

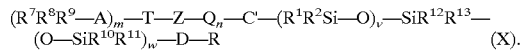   (X).

3. The protected functionalized silicone copolymer of claim 1, wherein said copolymer comprises a compound of the formula

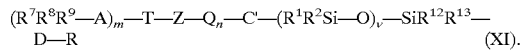   (XI).

4. The protected functionalized silicone copolymer of claim 1, wherein said copolymer comprises a compound of the formula

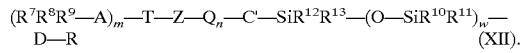   (XII).

5. The protected functionalized silicone copolymer of claim 1, wherein A is carbon.

6. The protected functionalized silicone copolymer of claim 1, wherein A is silicon.

7. A process for the preparation of protected functionalized silicone diene and alkenylsubstituted aromatic copolymers, comprising the steps of:

(1) anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenyl-substituted aromatic compounds, in an inert solvent, optionally in the presence of a polar modifier, at a temperature from about −30° C. to about 150° C., for a period of at least about one hour, with a protected functionalized initiator having the formula:

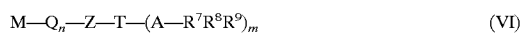   (VI)

wherein:

M is an alkali metal;

Q is an unsaturated or hydrogenated hydrocarbyl group derived by incorporation of one or more conjugated diene hydrocarbons, one or more alkenylsubstituted aromatic compounds, or a mixture of one or more conjugated dienes with one or more alkenylsubstituted aromatic compounds;

Z is a branched or straight chain hydrocarbon connecting group which contains 3–25 carbon atoms, optionally substituted with aryl or substituted aryl;

T is selected from the group consisting of oxygen, sulfur, and nitrogen groups and mixtures thereof;

$(A-R^7R^8R^9)_m$ is a protecting group in which A is an element selected from Group IVa of the Periodic Table of the Elements, $R^7$, $R^8$, and $R^9$ are independently selected from the group consisting of hydrogen, alkyl, substituted alkyl, aryl, substituted aryl, cycloalkyl and substituted cycloalkyl, or when T is nitrogen, each $R^9$ is optionally a $-(CR'R')_l$-group linking two A wherein each R' is each independently selected from the group consisting of hydrogen, alkyl, substituted alkyl, aryl, substituted aryl, cycloalkyl, and substituted cycloalkyl, and l is an integer from 1 to 7; and m is 1 when T is oxygen or sulfur, and 2 when T is nitrogen; and n is an integer from 0 to 5;

to produce at least one protected, functionalized living polymer anion of the formula $(R^7R^8R^9—A)_m—T—Z—Q_n—C'—M$, wherein C' is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

(2) anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenyl-substituted aromatic compounds, in an inert solvent, optionally in the presence of a polar modifier, at a temperature from about −30° C. to about 150° C., for a period of at least about one hour, with an initiator having the formula R—M, wherein R is a hydrocarbyl group of 1–20 carbon atoms and M is an alkali metal, to produce at least one non-functionalized living polymer anion R—D—M, wherein D is a hydrogenated or unsaturated block derived by anionic polymerization of one or more conjugated dienes, one or more alkenyl-substituted aromatic compounds, or a mixture of one or more conjugated dienes and one or more alkenylsubstituted aromatic compounds;

(3) reacting said protected functionalized living polymer anion of (1), or said non-functionalized living polymer anion of (2), or both, with one or more siloxane monomers to form at least one silicone block living copolymer anion;

(4) capping at least one of said protected functionalized living polymer anion of (1), said non-functionalized living polymer anion of (2) or said silicone block living copolymer anion of (3) with one or more dialkyl or diaryl silicon dihalide silicone capping agents to form at least one polymer capped with a reactive halogen; and (5) coupling at least one of said capped polymers of (4) with one of said protected functionalized living polymer anion of (1), said non-functionalized living polymer anion of (2), or said silicone block living copolymer anion of (3).

8. The process of claim 7, wherein step (3) comprises reacting said protected funtionalized living polymer anion of (1).

9. The process of claim 7, wherein step (3) comprises reacting said non-functionalized living polymer anion of (2).

10. The process of claim 7, wherein step (3) comprises reacting said protected functionalized living polymer anion of (1) and said non-functionalized living polymer anion of (2).

11. The process of claim 7, wherein step (4) comprises capping said protected functionalized living polymer anion of (1).

12. The process of claim 7, wherein step (4) comprises capping said non-functionalized living polymer anion of (2).

13. The process of claim 7, wherein step (4) comprises capping said silicone block living copolymer anion of (3).

14. A process for the preparation of protected functionalized silicone diene and alkenylsubstituted aromatic copolymers, comprising the steps of:

anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about −30° C. to about 150° C., for a period of at least about one hour, with a protected functionalized initiator having the formula:

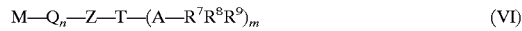

$$M—Q_n—Z—T—(A—R^7R^8R^9)_m \qquad (VI)$$

wherein:

M is an alkali metal;

Q is an unsaturated or hydrogenated hydrocarbyl group derived by incorporation of one or more conjugated diene hydrocarbons, one or more alkenylsubstituted aromatic compounds, or a mixture of one or more conjugated dienes with one or more alkenylsubstituted aromatic compounds;

Z is a branched or straight chain hydrocarbon connecting group which contains 3–25 carbon atoms, optionally substituted with aryl or substituted aryl;

T is selected from the group consisting of oxygen, sulfur, and nitrogen groups and mixtures thereof;

$(A—R^7R^8R^9)_m$ is a protecting group in which A is an element selected from Group Iva of the Periodic Table of the Elements, $R^7$, $R^8$, and $R^9$ are independently selected from the group consisting of hydrogen, alkyl, substituted alkyl, aryl, substituted aryl, cycloalkyl and substituted cycloalkyl, or when T is nitrogen, each $R^9$ is optionally a —$(CR'R')_l$-group linking two A wherein each R' is each independently selected from the group consisting of hydrogen, alkyl, substituted alkyl, aryl, substituted aryl, cycloalkyl, and substituted cycloalkyl, and l is an integer from 1 to 7; and m is 1 when T is oxygen or sulfur, and 2 when T is nitrogen; and n is an integer from 0 to 5;

to produce at least one protected, functionalized living polymer anion of the formula $(R^7R^8R^9—A)_m—T—Z—Q_n—C'—M$, wherein C' is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

anionically polymerizing one or more cyclic siloxane monomers $(R^1R^2SiO)_y$ wherein each $R^1$ and $R^2$ is independently selected from the group consisting of hydrogen, alkyl, substituted alkyl, alkenyl, substituted alkenyl, aryl, and substituted aryl and y=3–10, in an inert solvent, optionally containing a polymerization promoter, at a temperature from about −30° C. to about 250° C., for a period of at least about one hour, with said protected functionalized living polymer anion $(R^7R^8R^9—A)_m—T—Z—Q_n—C'—M$ to form one or more silicone block copolymer anions of the formula $(R^7R^8R^9—A)_m—T—Z—Q_n—C'—(R^1R^2Si—O)_v—M$, wherein v is an integer from 2 to 100,000;

anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about −30° C. to about 150° C., for a period of at least about one hour, with an initiator having the formula R—M, wherein R is a hydrocarbyl group of 1–20 carbon atoms and M is an alkali metal, to produce at least one non-functionalized living polymer anion R—D—M, wherein D is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

anionically polymerizing one or more cyclic siloxane monomers $(R^{10}R^{11}SiO)_y$, wherein each $R^{10}$ and $R^{11}$ is independently selected from the group consisting of hydrogen, alkyl, substituted alkyl, alkenyl, substituted alkenyl, aryl, and substituted aryl and y=3–10, in an inert solvent, optionally containing a polymerization promoter, at a temperature from about –30° C. to about 250° C., for a period of at least about one hour, with said living polymer anion R—D—M to form one or more silicone block copolymer anions of the formula R—D—$(SiR^{10}R^{11}$—$O)_w$—M, wherein w is an integer from 2 to 100,000;

capping at least one of said silicone block copolymer anions of the formula $(R^7R^8R^9$—$A)_m$—T—Z—$Q_n$—C'—$(R^1R^2Si$—$O)_v$—M or of the formula R—D—$(SiR^{10}R^{11}$—$O)_w$—M with a dialkyl or diaryl silicon dihalide of the formula $R^{12}R^{13}SiX_2$, wherein $R^{12}$ and $R^{13}$ are each independently selected from the group consisting of hydrogen, alkyl, substituted alkyl, alkenyl, substituted alkenyl, aryl, and substituted aryl and X is halide, to form a halogen capped protected block copolymer $(R^7R^8R^9$—$A)_m$—T—Z—$Q_n$—C'—$(R^1R^2Si$—$O)_v$—$SiR^{12}R^{13}$—X or R—D—$(SiR^{10}R^{11}$—$O)_w$—$SiR^{12}R^{13}$—X; and coupling at least one of said capped copolymers with one of said silicone block copolymer anion $(R^7R^8R^9$—$A)_m$—T—Z—$Q_n$—C'—$(R^1R^2Si$—$O)_v$—M or said silicone block copolymer anion R—D—$(SiR^{10}R^{11}$—$O)_w$—M.

15. The process of claim 14, wherein:

said capping step comprises reacting said silicone block copolymer anion of the formula $(R^7R^8R^9$—$A)_m$—T—Z—$Q_n$—C'—$(R^1R^2Si$—$O)_v$—M with said dialkyl or diaryl silicon dihalide $R^{12}R^{13}SiX_2$ to make a capped polymer of the formula $(R^7R^8R^9$—$A)_m$—T—Z—$Q_n$—C'—$(R^1R^2Si$—$O)_v$—$SiR^{12}R^{13}$ X; and said coupling step comprises coupling said capped polymer $(R^7R^8R^9$—$A)_m$—T—Z—$Q_n$—C'—$(R^1R^2Si$—$O)_v$—$SiR^{12}R^{13}$—X with said silicone block copolymer anion R—D—$(SiR^{10}R^{11}$—$O)_w$—M to make a polymer of the formula $(R^7R^8R^9$—$A)_m$—T—Z—$Q_n$—C'—$(R^1R^2Si$—$O)_v$—$SiR^{12}R^{13}$—$(O$—$SiR^{10}R^{11})_w$—D—R.

16. The process of claim 14, wherein:

said capping step comprises reacting said silicone block copolymer anion of the formula R—D—$(SiR^{10}R^{11}$—$O)_w$—M with said dialkyl or diaryl silicon dihalide $R^{12}R^{13}SiX_2$ to make a capped polymer of the formula R—D—$(R^{10}R^{11}Si$—$O)_w$—$SiR^{12}R^{13}$—X; and said coupling step comprises coupling said capped polymer R—D—$(R^{10}R^{11}Si$—$O)_w$—$SiR^{12}R^{13}$—X with said silicone block copolymer anion $(R^7R^8R^9$—$A)_m$—T—Z—$Q_n$—C'—$(R^1R^2Si$—$O)_v$—M to make a polymer of the formula $(R^7R^8R^9$—$A)_m$—T—Z—$Q_n$—C'—$(R^1R^2Si$—$O)_v$—$SiR^{12}R^{13}$—$(O$—$SiR^{10}R^{11})_w$—D—R.

17. The process of claim 14, further comprising:

removing at least one protecting group $(A$—$R^7R^8R^9)_m$ to liberate at least one functional group T; and optionally reacting said liberated functional group T with one or more comonomers to produce a polymer segment.

18. The process of claim 17, wherein said removing step and said reacting step occur simultaneously.

19. The process of claim 14, further comprising:

removing at least one protecting group $(A$—$R^7R^8R^9)_m$ to liberate at least one functional group T; and optionally reacting said liberated functional group T under conditions sufficient to modify the functionality of T to incorporate a reactive olefinic bond.

20. The process of claim 14, further comprising the step of hydrogenating said capped copolymer coupled with one of said silicone block copolymer anion $(R^7R^8R^9$—$A)_m$—T—Z—$Q_n$—C'—$(R^1R^2Si$—$O)_v$—M or said silicone block copolymer anion R—D—$(SiR^{10}R^{11}$—$O)_w$—M.

21. A process for the preparation of protected functionalized silicone diene and alkenylsubstituted aromatic copolymers, comprising the steps of:

anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about –30° C. to about 150° C., for a period of at least about one hour, with a protected functionalized initiator having the formula:

$$M—Q_n—Z—T—(A—R^7R^8R^9)_m \qquad (VI)$$

wherein:

M is an alkali metal;

Q is an unsaturated or hydrogenated hydrocarbyl group derived by incorporation of one or more conjugated diene hydrocarbons, one or more alkenylsubstituted aromatic compounds, or a mixture of one or more conjugated dienes with one or more alkenylsubstituted aromatic compounds;

Z is a branched or straight chain hydrocarbon connecting group which contains 3–25 carbon atoms, optionally substituted with aryl or substituted aryl;

T is selected from the group consisting of oxygen, sulfur, and nitrogen groups and mixtures thereof;

$(A$—$R^7R^8R^9)_m$ is a protecting group in which A is an element selected from Group IVa of the Periodic Table of the Elements, $R^7$, $R^5$, and $R^8$ are independently selected from the group consisting of hydrogen, alkyl, substituted alkyl, aryl, substituted aryl, cycloalkyl and substituted cycloalkyl, or when T is nitrogen, each $R^9$ is optionally a —$(CR'R')_l$-group linking two A wherein each R' is each independently selected from the group consisting of hydrogen, alkyl, substituted alkyl, aryl, substituted aryl, cycloalkyl, and substituted cycloalkyl, and l is an integer from 1 to 7; and m is 1 when T is oxygen or sulfur, and 2 when T is nitrogen; and n is an integer from 0 to 5;

to produce at least one protected, functionalized living polymer anion of the formula $(R^7R^8R^9$—$A)_m$—T—Z—$Q_n$—C'—M, wherein C' is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

anionically polymerizing one or more cyclic siloxane monomers $(R^1R^2SiO)_y$ wherein each $R^1$ and $R^2$ is independently selected from the group consisting of hydrogen, alkyl, substituted alkyl, alkenyl, substituted alkenyl, aryl, and substituted aryl and y=3–10, in an inert solvent, optionally containing a polymerization promoter, at a temperature from about −30° C. to about 250° C., for a period of at least about one hour, with said protected functionalized living polymer anion $(R^7R^8R^9—A)_m—T—Z—Q_n—C'—M$ to form one or more silicone block copolymer anions of the formula $(R^7R^8R^9—A)_m—T—Z—Q_n—C'—(R^1R^2Si—O)_v—M$, wherein v is an integer from 2 to 100,000;

anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about −30° C. to about 150° C., for a period of at least about one hour, with an initiator having the formula R—M, wherein R is a hydrocarbyl group of 1–20 carbon atoms and M is an alkali metal, to produce at least one non-functionalized living polymer anion R—D—M, wherein D is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

capping at least one of said silicone block copolymer anion of the formula $(R^7R^8R^9—A)_m—T—Z—Q_n—C'—(R^1R^2Si—O)_v—M$ or said non-functionalized living polymer anion of the formula R—D—M with a dialkyl or diaryl silicon dihalide of the formula $R^{12}R^{13}SiX_2$, wherein $R^{12}$ and $R^{13}$ are each independently selected from the group consisting of hydrogen, alkyl, substituted alkyl, alkenyl, substituted alkenyl, aryl, and substituted aryl and X is halide, to form a halogen capped polymer of the formula $(R^7R^8R^9—A)_m—T—Z—Q_n—C'—(R^1R^2Si—O)_v—SiR^{12}R^{13}—X$ or $R—D—SiR^{12}R^{13}—X$; and coupling at least one of said capped polymers with at least one of said non-functionalized living polymer anion R—D—M or said silicone block copolymer anion of the formula $(R^7R^8R^9—A)_m—T—Z—Q_n—C'—(R^1R^2Si—O)_v—M$.

22. The process of claim 21, wherein:

said capping step comprises reacting said silicone block copolymer anion of the formula $(R^7R^8R^9—A)_m—T—Z—Q_n—C'—(R^1R^2Si—O)_v—M$ with said dialkyl or diaryl silicon dihalide $R^{12}R^{13}SiX_2$ to make a capped polymer of the formula $(R^7R^8R^9—A)_m—T—Z—Q_n—C'—(R^1R^2Si—O)_v—SiR^{12}R^{13}—X$; and said coupling step comprises coupling said capped polymer $(R^7R^8R^9—A)_m—T—Z—Q_n—C'—(R^1R^2Si—O)_v—SiR^{12}R^{13}—X$ with said non-functionalized living polymer anion R—D—M to make a polymer of the formula $(R^7R^8R^9—A)_m—T—Z—Q_n—C'—(R^1R^2Si—O)_v—SiR^{12}R^{13}—D—R$.

23. The process of claim 21, wherein:

said capping step comprises reacting said non-functionalized living polymer anion of the formula R—D—M with said dialkyl or diaryl silicon dihalide $R^{12}R^{13}SiX_2$ to make a capped polymer of the formula R—D—$SiR^{12}R^{13}$—X; and said coupling step comprises coupling said capped polymer R—D—$SiR^{12}R^1$—X with said silicone block copolymer anion $(R^7R^8R^9—A)_m—T—Z—Q_n—C'—(R^1R^2Si—O)_v—M$ to make a polymer of the formula $(R^7R^8R^9—A)_m—T—Z—Q_n—C'—(R^1R^2Si—O)_v—SiR^{12}R^{13}—D—R$.

24. The process of claim 21, further comprising:

removing at least one protecting group $(A—R^7R^8R^9)_m$ to liberate at least one functional group T; and optionally reacting said liberated functional group T with one or more comonomers to produce a polymer segment.

25. The process of claim 24, wherein said removing step and said reacting step occur simultaneously.

26. The process of claim 21, further comprising:

removing at least one protecting group $(A—R^7R^8R^9)_m$ to liberate at least one functional group T; and optionally reacting said liberated functional group T under conditions sufficient to modify the functionality of T to incorporate a reactive olefinic bond.

27. The process of claim 21, further comprising the step of hydrogenating said capped polymer coupled with one of said non-functionalized living polymer anion R—D—M or said silicone block copolymer anion of the formula $(R^7R^8R^9—A)_m—T—Z—Q_n—C'—(R^1R^2Si—O)_v—M$.

28. A process for the preparation of protected functionalized silicone diene and alkenylsubstituted aromatic copolymers, comprising the steps of:

anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about −30° C. to about 150° C., for a period of at least about one hour, with a protected functionalized initiator having the formula:

$$M—Q_n—Z—T—(A—R^7R^8R^9)_m \qquad (VI)$$

wherein:

M is an alkali metal;

Q is an unsaturated or hydrogenated hydrocarbyl group derived by incorporation of one or more conjugated diene hydrocarbons, one or more alkenylsubstituted aromatic compounds, or a mixture of one or more conjugated dienes with one or more alkenylsubstituted aromatic compounds;

Z is a branched or straight chain hydrocarbon connecting group which contains 3–25 carbon atoms, optionally substituted with aryl or substituted aryl;

T is selected from the group consisting of oxygen, sulfur, and nitrogen groups and mixtures thereof;

$(A—R^7R^8R^9)_m$ is a protecting group in which A is an element selected from Group IVa of the Periodic Table of the Elements, $R^7$, $R^8$, and $R^9$ are independently selected from the group consisting of hydrogen, alkyl, substituted alkyl, aryl, substituted aryl, cycloalkyl and substituted cycloalkyl, or when T is nitrogen, each $R^9$ is optionally a —$(CR'R')_r$-group linking two A wherein each R' is each independently selected from the group consisting of hydrogen, alkyl, substituted alkyl, aryl, substituted aryl, cycloalkyl, and substituted cycloalkyl, and l is an integer from 1 to 7; and m is 1 when T is oxygen or sulfur, and 2 when T is nitrogen; and n is an integer from 0 to 5;

to produce at least one protected, functionalized living polymer anion of the formula $(R^7R^8R^9-A)_m-T-Z-Q_n-C'-M$, wherein C' is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

anionically polymerizing one or more conjugated diene monomers, a mixture of conjugated diene monomers, one or more alkenylsubstituted aromatic compounds, a mixture of alkenylsubstituted aromatic compounds, or a mixture of one or more conjugated diene monomers together with one or more alkenylsubstituted aromatic compounds, in an inert solvent, optionally in the presence of a polar modifier, at a temperature from about −30° C. to about 150° C., for a period of at least about one hour, with an initiator having the formula R—M, wherein R is a hydrocarbyl group of 1–20 carbon atoms and M is an alkali metal, to produce at least one non-functionalized living polymer anion R—D—M, wherein D is a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

anionically polymerizing one or more cyclic siloxane monomers $(R^{10}R^{11}SiO)_y$, wherein each $R^{10}$ and $R^{11}$ is independently selected from the group consisting of hydrogen, alkyl, substituted alkyl, alkenyl, substituted alkenyl, aryl, and substituted aryl and y=3–10, in an inert solvent, optionally containing a polymerization promoter, at a temperature from about −30° C. to about 250° C., for a period of at least about one hour, with said living polymer anion R—D—M to form one or more silicone block copolymer anions of the formula $R-D-(SiR^{10}R^{11}-O)_w-M$, wherein w is an integer from 2 to 100,000;

capping at least one of said protected functionalized polymer anion of the formula $(R^7R^8R^9-A)_m-T-Z-Q_n-C'-M$ or said silicone block copolymer anion of the formula $R-D-(SiR^{10}R^{11}-O)_w-M$ with a dialkyl or diaryl silicon dihalide of the formula $R^{12}R^{13}SiX_2$, wherein $R^{12}$ and $R^{13}$ are each independently selected from the group consisting of hydrogen, alkyl, substituted alkyl, alkenyl, substituted alkenyl, aryl, and substituted aryl and X is halide, to form a halogen capped polymer $(R^7R^8R^9-A)_m-T-Z-Q_n-C'-SiR^{12}R^{13}-X$ or $R-D-(SiR^{10}R^{11}-O)_w-SiR^{12}R^{13}-X$; and coupling at least one of said capped polymers with at least one of said protected functionalized living polymer anion of the formula $(R^7R^8R^9-A)m-T-Z-Q_n-C'-M$ or said silicone block copolymer of the formula $R-D-(SiR^{10}R^{11}-O)_w-M$.

29. The process of claim 28, wherein:

said capping step comprises reacting said protected functionalized living polymer anion of the formula $(R^7R^8R^9-A)_m-T-Z-Q_n-C'-M$ with said dialkyl or diaryl silicon dihalide $R^{12}R^{13}SiX_2$ to make a capped polymer of the formula $(R^7R^8R^9-A)_m-T-Z-Q_n-C'-SiR^{12}R^{13}-X$; and said coupling step comprises coupling said capped polymer $(R^7R^8R^9-A)_m-T-Z-Q_n-C'-SiR^{12}R^{13}-X$ with said silicone block copolymer anion $R-D-(SiR^{10}R^{11}-O)_w-M$ to make a polymer of the formula $(R^7R^8R^9-A)_m-T-Z-Q_n-C'-SiR^{10}R^{11}-(O-SiR^{10}R^{11})_w-D-R$.

30. The process of claim 28, wherein:

said capping step comprises reacting said silicone block copolymer anion of the formula $R-D-(SiR^{10}R^{11}-O)_w-M$ with said dialkyl or diaryl silicon dihalide $R^{12}R^{13}SiX_2$ to make a capped polymer of the formula $R-D-(R^{10}R^{11}Si-O)_w-SiR^{12}R^{13}-X$; and said coupling step comprises coupling said capped polymer $R-D-(R^{10}R^{11}Si-O)_w-SiR^{12}R^{13}-X$ with said protected functionalized living polymer anion $(R^7R^8R^9-A)_m-T-Z-Q_n-C'-M$ to make a polymer of the formula $(R^7R^8R^9-A)_m-T-Z-Q_n-C'-SiR^{12}R^{13}-(O-SiR^{10}R^{11})_w-D-R$.

31. The process of claim 28, further comprising:

removing at least one protecting group $(A-R^7R^8R^9)_m$ to liberate at least one functional group T; and optionally reacting said liberated functional group T with one or more comonomers to produce a polymer segment.

32. The process of claim 31, wherein said removing step and said reacting step occur simultaneously.

33. The process of claim 28, further comprising:

removing at least one protecting group $(A-R^7R^8R^9)_m$ to liberate at least one functional group T; and optionally reacting said liberated functional group T under conditions sufficient to modify the functionality of T to incorporate a reactive olefinic bond.

34. The process of claim 28, further comprising the step of hydrogenating said capped copolymer coupled with at least one of said protected functionalized living polymer anion of the formula $(R^7R^8R^9-A)_m-T-Z-Q_n-C'-M$ or said silicone block copolymer of the formula $R-D-(SiR^{10}R^{11}-O)_w-M$.

35. A functionalized silicone diene or alkenylsubstituted aromatic copolymer selected from the group consisting of:

$(H)_m-T-Z-Q_n-C'-(R^1R^2Si-O)_v-SiR^{12}R^{13}-(O-SiR^{10}R^{11})_w-D-R$, $(H)_m-T-Z-Q_n-C'-(R^1R^2Si-O)_v-SiR^{12}R^{13}-D-R$ and $(H)_m-T-Z-Q_n-C'-SiR^{12}R^{13}-(O-SiR^{10}R^{11})_w-D-R$ wherein:

each Q is independently selected from an unsaturated or hydrogenated hydrocarbyl group derived by incorporation of one or more conjugated diene hydrocarbons, one or more alkenylsubstituted aromatic compounds, or a mixture of one or more dienes with one or more alkenylsubstituted aromatic compounds;

each n is independently an integer from 0 to 5;

each Z is independently selected from a branched or straight chain hydrocarbon connecting group which contains 3–25 carbon atoms, optionally substituted with aryl or substituted aryl;

each C' and D is independently selected from a hydrogenated or unsaturated block derived by anionic polymerization of one or more conjugated dienes, one or more alkenylsubstituted aromatic compounds, or a mixture of one or more conjugated dienes and one or more alkenylsubstituted aromatic compounds;

each T is independently selected from the group consisting of oxygen, sulfur, and nitrogen groups and mixtures thereof;

m is 1 or 2;

each $R^1$, $R^2$, $R^{10}$, $R^{11}$, $R^{12}$, and $R^{13}$ is independently selected from the group consisting of hydrogen, alkyl, substituted alkyl, alkenyl, substituted alkenyl, aryl, and substituted aryl;

each R is independently selected from a hydrocarbyl group of 1–20 carbon atoms derived from an unfunctionalized initiator capable of initiating polymerization of conjugated dienes or alkenyl substituted aromatic compounds; and each w and v is independently selected from an integer from 2 to 100,000.

36. The functionalized silicone copolymer of claim 35, wherein said copolymer comprises a compound of the formula

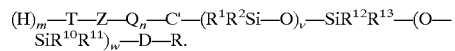

37. The functionalized silicone copolymer of claim 35, wherein said copolymer comprises a compound of the formula

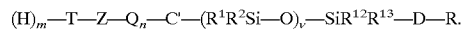

38. The functionalized silicone copolymer of claim 35, wherein said copolymer comprises a compound of the formula

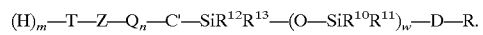

* * * * *

UNITED STATES PATENT AND TRADEMARK OFFICE
CERTIFICATE OF CORRECTION

PATENT NO. : 6,344,521 B1
DATED : February 5, 2002
INVENTOR(S) : Schwindeman et al.

It is certified that error appears in the above-identified patent and that said Letters Patent is hereby corrected as shown below:

Column 2,
Line 30, "R7" should read -- $R^7$ --.

Column 4,
After Line 4, insert the following:
-- each n is independently selected from an integer from 0 to 5; each Z is independently selected from a branched or straight chain hydrocarbon connecting group which contains 3-25 carbon atoms, optionally substituted with aryl or substituted aryl; --.
After Line 12, insert the following:
-- each T is independently selected from the group consisting of oxygen, sulfur, and nitrogen groups and mixtures thereof; --.

Column 7,
After Line 10, insert the following:
-- $R^1$ and $R^2$ are each independently selected from the group consisting of hydrogen, alkyl, substituted alkyl, alkenyl, substituted alkenyl, aryl, and substituted aryl; --.
After Line 52, insert the following:
-- each n is independently selected from an integer from 0 to 5; --.

Column 9,
Line 47, "(A—$R^7R^8R^9$)m" should read -- (A— $R^7R^8R^9$)$_m$ --.
Line 53, "(CR'R')$_2$" should read -- (CR'R')$_1$ --.

Column 10,
Line 19, "$^{R4'}$" should read -- $R^{4'}$ --.

Column 13,
Line 34, "X(XV)" should read -- X (XV) --.

Column 34,
Line 27, "Iva" should read -- IVa --.

Column 35,
Line 46, "$R^{13}$13 X" should read -- $R^{13}$-X --.

UNITED STATES PATENT AND TRADEMARK OFFICE
CERTIFICATE OF CORRECTION

PATENT NO. : 6,344,521 B1
DATED : February 5, 2002
INVENTOR(S) : Schwindeman et al.

It is certified that error appears in the above-identified patent and that said Letters Patent is hereby corrected as shown below:

<u>Column 36,</u>
Line 50, "$R^5$, and $R^8$" should read -- $R^8$, and $R^9$ --.

<u>Column 38,</u>
Line 4, "$R^2R^1$" should read -- $R^{12}R^{13}$ --.

<u>Column 39,</u>
Line 58, "A)m" should read -- A)$_m$ --.

<u>Column 40,</u>
Line 5, "$R^{10}R^{11}$" should read -- $R^{12}R^{13}$ --.

Signed and Sealed this

Twentieth Day of May, 2003

JAMES E. ROGAN
*Director of the United States Patent and Trademark Office*